US009767635B2

(12) United States Patent
Yuyama et al.

(10) Patent No.: US 9,767,635 B2
(45) Date of Patent: Sep. 19, 2017

(54) MEDICAMENT DISPENSING MACHINE

(71) Applicant: YUYAMA MFG. CO., LTD., Toyonaka-shi, Osaka (JP)

(72) Inventors: Shoji Yuyama, Toyonaka (JP); Naoki Koike, Toyonaka (JP); Takafumi Imai, Toyonaka (JP); Yoshinori Kumano, Toyonaka (JP); Akira Maeda, Toyonaka (JP); Mitsuhiro Mitani, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 579 days.

(21) Appl. No.: 14/169,044

(22) Filed: Jan. 30, 2014

(65) Prior Publication Data

US 2014/0144544 A1 May 29, 2014

Related U.S. Application Data

(63) Continuation-in-part of application No. 13/260,723, filed as application No. PCT/JP2011/054247 on Feb. 25, 2011, now Pat. No. 9,021,769.

(30) Foreign Application Priority Data

Mar. 3, 2010 (JP) ................................ 2010-046405
Jan. 18, 2011 (JP) ................................ 2011-008092

(51) Int. Cl.
*G07F 11/16* (2006.01)
*B65B 43/46* (2006.01)
(Continued)

(52) U.S. Cl.
CPC .............. *G07F 11/16* (2013.01); *B65B 5/103* (2013.01); *B65B 43/46* (2013.01); *B65B 59/02* (2013.01);
(Continued)

(58) Field of Classification Search
USPC ... 53/443, 467, 471, 505, 67, 147, 235, 247, 53/249, 250, 251, 266.1, 284.5
See application file for complete search history.

(56) References Cited

U.S. PATENT DOCUMENTS 5,405,048 A * 4/1995 Rogers ................ B65G 1/1373 221/1
5,477,663 A * 12/1995 Smith ...................... B65B 5/08 53/244
(Continued)

FOREIGN PATENT DOCUMENTS

JP 2009-000291 A1 1/2009

*Primary Examiner* — Christopher Harmon
(74) *Attorney, Agent, or Firm* — Masuvalley & Partners

(57) ABSTRACT

The medicament dispensing machine enables to use vials having various sizes and shapes without changing a part in the machine or without performing a special operation. The medicament dispensing machine contains a discharging unit that receives a vial filled with a medicament from a medicament filling means and discharges out of a vial discharging window. The discharging unit contains a vial gripping means having a pair of gripping arms that grip a vial, a body of gripping means having the vial gripping means, a moving means that moves the vial gripping means from the medicament filling means to the vial discharging window, and an orientation changing mechanism that changes the orientation of the body of gripping means. With a coordination of the movement of the body of gripping means toward the vial discharging window, the orientation changing mechanism makes the gripping arms orient to the vial discharging window.

12 Claims, 29 Drawing Sheets

(51) Int. Cl.
*B65B 59/02* (2006.01)
*B65B 5/10* (2006.01)
*G07F 11/70* (2006.01)
*G07F 17/00* (2006.01)

(52) U.S. Cl.
CPC ............ *G07F 11/165* (2013.01); *G07F 11/70* (2013.01); *G07F 17/0092* (2013.01)

(56) References Cited

U.S. PATENT DOCUMENTS 5,671,592 A * 9/1997 Yuyama .............. G07F 17/0092 53/168
5,720,154 A * 2/1998 Lasher ...................... G07F 5/18 53/168
5,873,488 A * 2/1999 Guerra ..................... B25J 15/00 221/2
5,884,457 A * 3/1999 Ortiz ..................... B65B 7/2835 53/167
5,946,883 A * 9/1999 Yuyama .................. B65B 5/103 53/131.3
6,006,946 A * 12/1999 Williams ............... B65G 1/045 221/2
6,115,996 A * 9/2000 Yuyama .................. B65B 5/103 53/131.3
6,256,967 B1 * 7/2001 Hebron ................... B65B 57/20 53/131.3
6,283,177 B1 * 9/2001 Naka .................... B65G 47/847 141/144
6,308,494 B1 * 10/2001 Yuyama .................. B65B 5/103 53/131.3
6,991,002 B2 * 1/2006 Osborne ................. B65B 3/003 141/21
7,549,275 B2 * 6/2009 Monti ....................... B65B 7/28 177/53
7,610,735 B2 * 11/2009 Monti ..................... B65B 5/103 53/244
7,770,357 B2 * 8/2010 Yuyama .................. B65B 5/103 53/167
8,403,010 B2 * 3/2013 Taniguchi ............... B65B 5/103 141/171
2004/0133705 A1 * 7/2004 Broussard ........... G06F 19/3462 710/1
2013/0340395 A1 * 12/2013 Moncrief .............. G06F 19/327 53/473

* cited by examiner (a)

(b)

(a)

(b)

(a)

(b)

MEDICAMENT DISPENSING MACHINE

This application is a Continuation-In-Part of U.S. patent application Ser. No. 13/260,723, filed Oct. 26, 2011, which claims priority under 35 U.S.C. §371 as a national Stage application of International PCT Application Serial No. PCT/JP2011/054247, filed Feb. 25, 2011, which further claims priority under 35 U.S.C. §119 from Japanese Patent Application Serial Nos. JP2010-046405 and JP2011-008092, filed respectively Mar. 3, 2010 and Jan. 18, 2011, which are hereby expressly incorporated by reference in their entirety for all purposes.

TECHNICAL FIELD

The present invention relates to a medicament dispensing machine for filling medicaments in vials.

BACKGROUND OF THE INVENTION

According to the tablet filling device disclosed in Patent Document 1 below, there has been conventionally provided a device, in which a vial is transferred from a stocker to a position where a medicament filling means is provided. There, the medicament is filled. In this machine, after filling the vial with the medicament, it is possible to supply the vial to a vial discharging window for discharging the vial.

PRIOR ART LITERATURE

Patent Literature

Patent Document 1: Japan Patent Application Publication 2009-000291

SUMMARY OF THE INVENTION

Problem to be Solved by the Invention

In the tablet filling device mentioned above, a stopper for supporting the vial in the vial discharging window, and members such as a guide member in the machine for transporting the vial from a medicament filling means to the vial discharging window, are working with several service recipes instructed by users. Also, the medicament filling device has several service routines and is required to perform multitasking projects within one machine. As the medicament filling device may usually include only one arm, it becomes very difficult to complete several service requirements quickly.

Because of such a problem, the purpose of the present invention is to provide a medicament dispensing machine that can work on multitasking projects without changing a part or running a special operation.

Means to Solve the Problem

The medicament filling device of the present invention includes a first vial gripping device for filling an empty vial with a medicament, a discharging unit having a second vial gripping device for receiving a vial filled with the medicament from the first vial gripping device, a vial discharging window for discharging the vial filled with the medicament by the second vial gripping device. The second vial gripping device waits for receipt of an input signal from the input device before discharging the vial filled with the medicament from the vial discharging window.

The second vial gripping device may wait until generating a signal for permitting access to the vial filled with the medicament. Also, the permitting access may be generated when a person requesting access has authority to pick up the vial filled with the medicament. The permitting access may be generated when the person requesting access is the same as the person initiating the dispensing or the person requesting access has authority to pick up medicament for the person initiating the dispensing. In this embodiment, the medicament filling device may identify whether the medicament filling device has performed filling of the empty vial with the medicament based on input information inputted by the input device.

In other embodiments, the medicament filling device of the present invention may have a first vial gripping device for filling an empty vial with a medicament, a discharging unit having a second vial gripping device for moving a vial filled with the medicament for discharging, a vial discharging window for discharging the vial filled with the medicament by the second vial gripping device, a storage area located between the first and the second vial gripping devices for storing the vial filled with the medicament, an input device for receiving information about the vial filled with the medicament, and a controller permitting access to the vial filled with the medicament based on the information inputted by the input device, wherein the first vial gripping device moves the vial filled with the medicament to the storage area and the second vial gripping device moves the vial filled with the medicament toward the vial discharging window after the controller permits access to the vial filled with the medicament.

The storage area may have a delivery table so that the first vial gripping device leaves the vial filled with the medicament on said delivery table, and the second vial gripping device picks up and move the vial filled with the medicament to one of the holding members. Here, the permitting access may be generated when a person requesting access has authority to pick up the vial filled with the medicament. Also, the permitting access may be generated when the person requesting access is the same as the person initiating the dispensing or the person requesting access has authority to pick up medicament for the person initiating the dispensing. Furthermore, the medicament filling device may identify whether the medicament filling device has performed filling of the empty vial with the medicament based on the input information inputted by the input device.

In accordance with other aspect of the present invention, there is provided a method for filling medicaments in vials. The method includes the steps of: filling an empty vial with a medicament while holding the vial with one vial gripping device; moving the vial toward a discharging window; passing the vial from the one vial gripping device to another vial gripping device before discharging; identifying the vial which requires service; inputting user information, determining if the user has authority to access the vial; and issuing an unlock command for discharging through the discharging window.

In this embodiment, the service required for the vial may include one of the following services: discharging, cleaning, stocking, and maintenance. Also, there is a storage area located between one and another vial gripping. The storage area may have several holding members that temporarily hold the vial filled with the medicament. Furthermore, the storage area may have a delivery table so that the first vial gripping device leaves the vial filled with the medicament on the delivery table, and the second vial gripping device picks up the vial filled with the medicament from the delivery table and move it to one of the holding members. One vial gripping device may leave the vial filled with the medicament on the delivery table and another vial gripping device picks up the vial filled with the medicament from one of the holding members after determining if the user has authority to access the vial. In another embodiment, one vial gripping device may leave the vial filled with the medicament on the delivery table and another vial gripping device picks up the vial filled with the medicament from one of the holding members after issuing the unlock command for discharging.

Effect of the Invention

The medicament dispensing machine of the present invention contains the several arms for vial transporting, in which the vial filled with the medicament is transported between the arms. Therefore, one machine can work on different recipes and routine activities.

The medicament dispensing machine of the present invention further includes a storage area having a delivery table and several holding members. By this configuration, it is possible to complete multitasking works more efficiently within one machine. In particular, after filling pills into the vial, the transporting arms move the vial to the delivery table, and other transporting arms move the vial to one of several holding members to stand by for next discharging timing. By this configuration, it is possible to discharge the vial to only person who has permit code to pick up the vial from the machine. The machine can hold several vials until the person with the permission get access to the machine to pick up the vial. Also, if the machine has different kinds of action routines such as cleaning, stocking or maintenance, the machine can complete those routine works without waiting for the action ends.

DETAILED DESCRIPTION OF THE INVENTION

Figure 1:
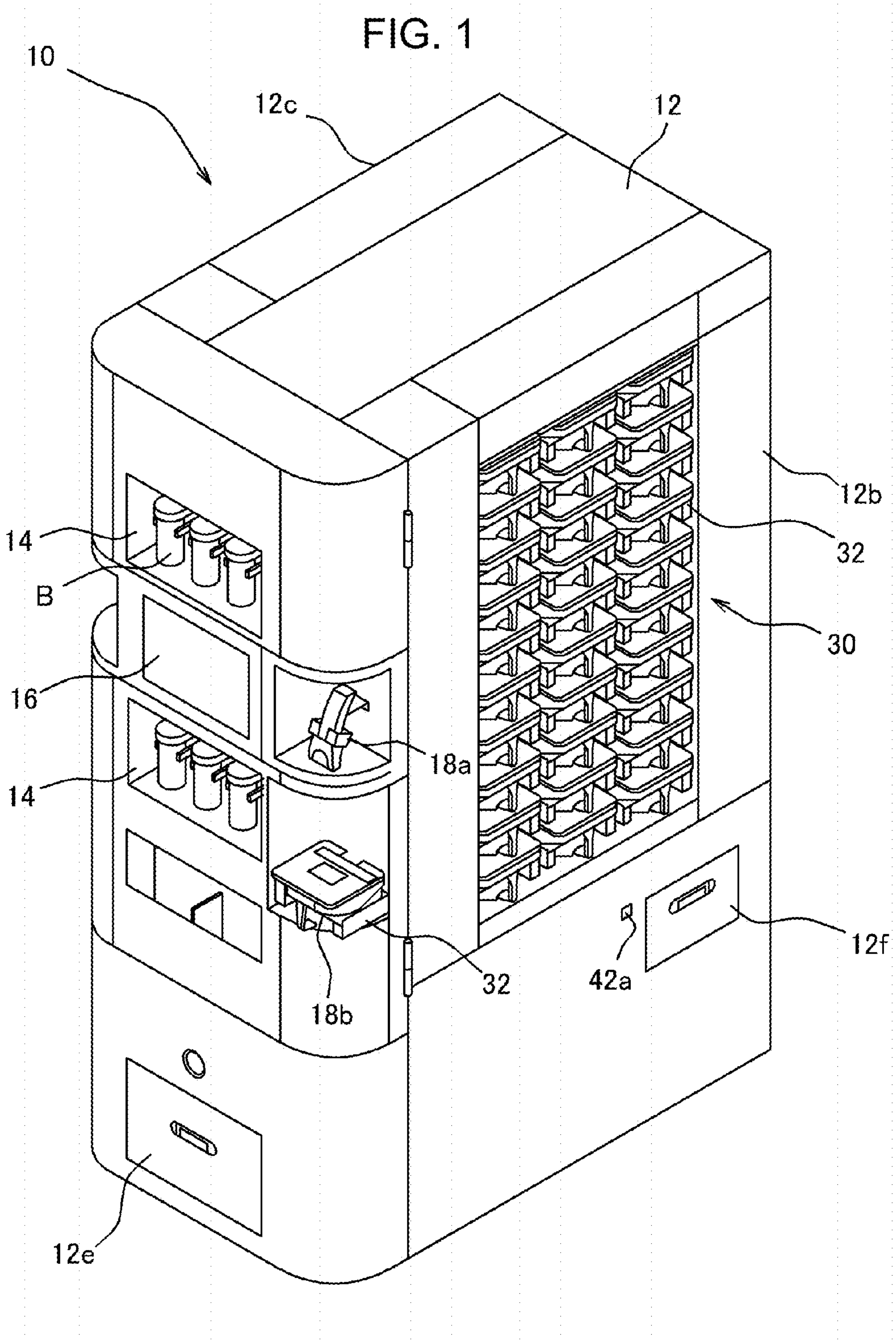
FIG. 1 is a perspective view of a medicament dispensing machine of one embodiment of the invention.
Figure 3:
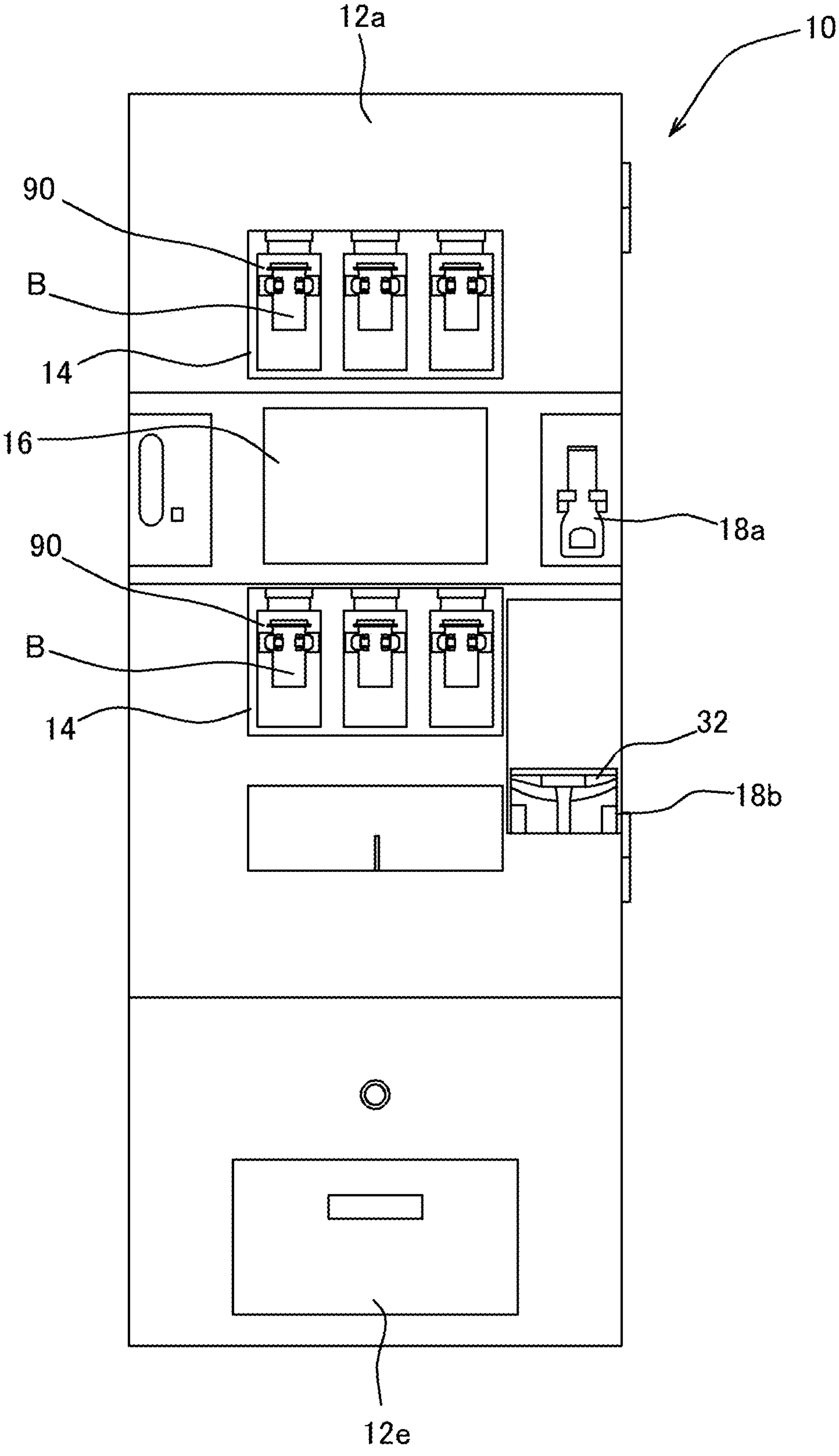
FIG. 3 is a front view of the medicament dispensing machine shown in FIG. 1.

A medicament dispensing machine 10 of one embodiment of the present invention is explained, referring to drawings. The medicament dispensing machine 10 is a device for filling vials B with tablets (medicaments) and dispensing the medicament-filled vials. As shown in FIGS. 1 & 3, on the front side 12*a* of the body 12 of the medicament dispensing machine 10 are provided vial discharging windows 14*a*-14*c* for discharging the vials B filled with the medicaments, an operating panel 16, a bar code reader 18*a*, and a bench 18*b*. At the bottom of the front side 12*a* is provided a label unit drawer door 12*e*. By pulling this door, a labeling unit 70 installed in the body 12 can be taken out.

Figure 2:
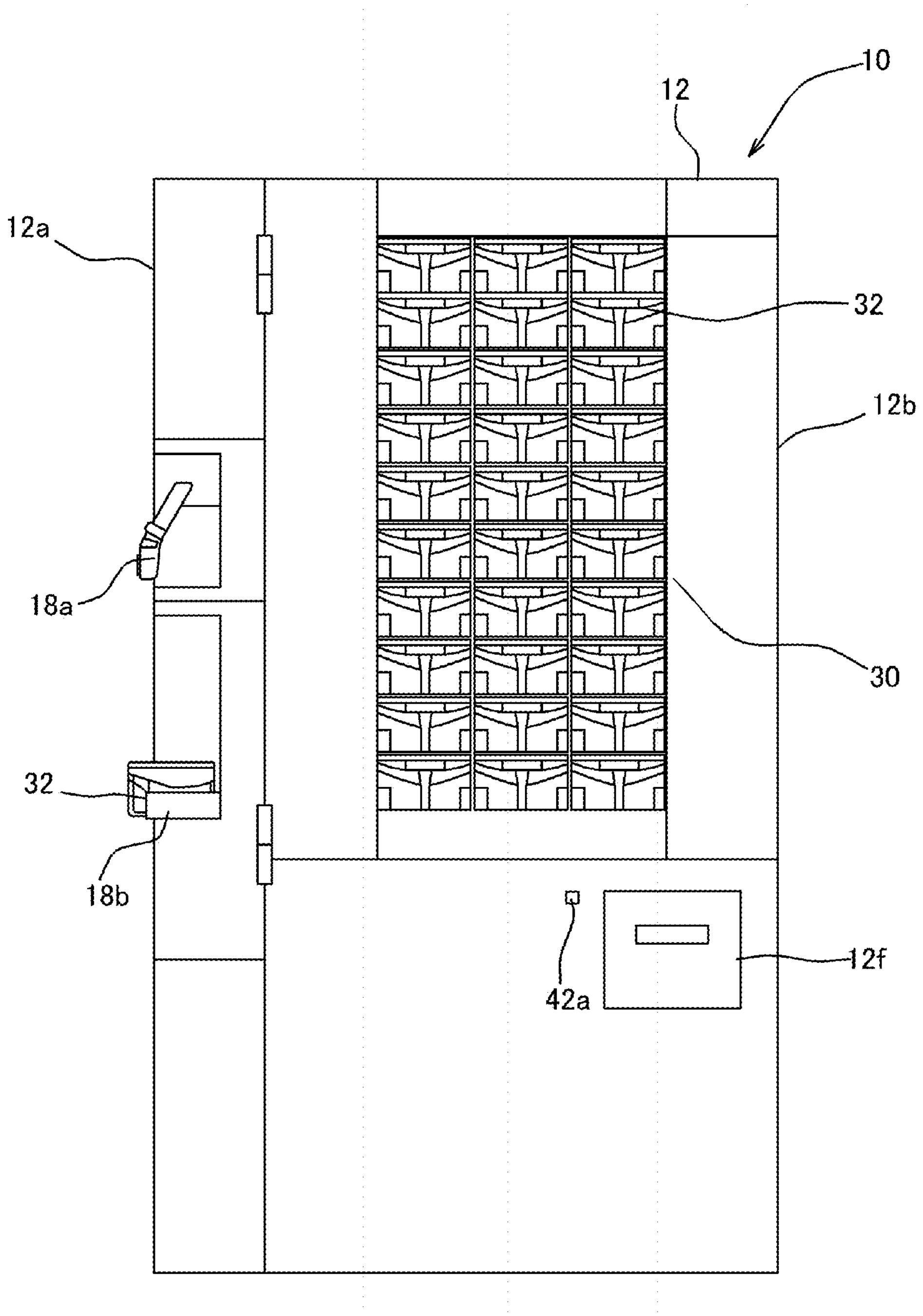
FIG. 2 is a side view of the medicament dispensing machine shown in FIG. 1.

As shown in FIGS. 1 & 2, plural tablet cassettes 32, which constitute a tablet feed unit 30 (medicament filling means) described later, are arranged in the body 12. The tablet cassettes 32 can be easily installed or removed from the sides 12*b* or 12*c*. Also, on the sides 12*b* and 12*c* is provided a drawer door 12*f* for supplying empty vials B. The vials B are replenished through this door and stored in a vial supply unit 40 (see FIGS. 5, 6 & 7) described later.

Figure 4:
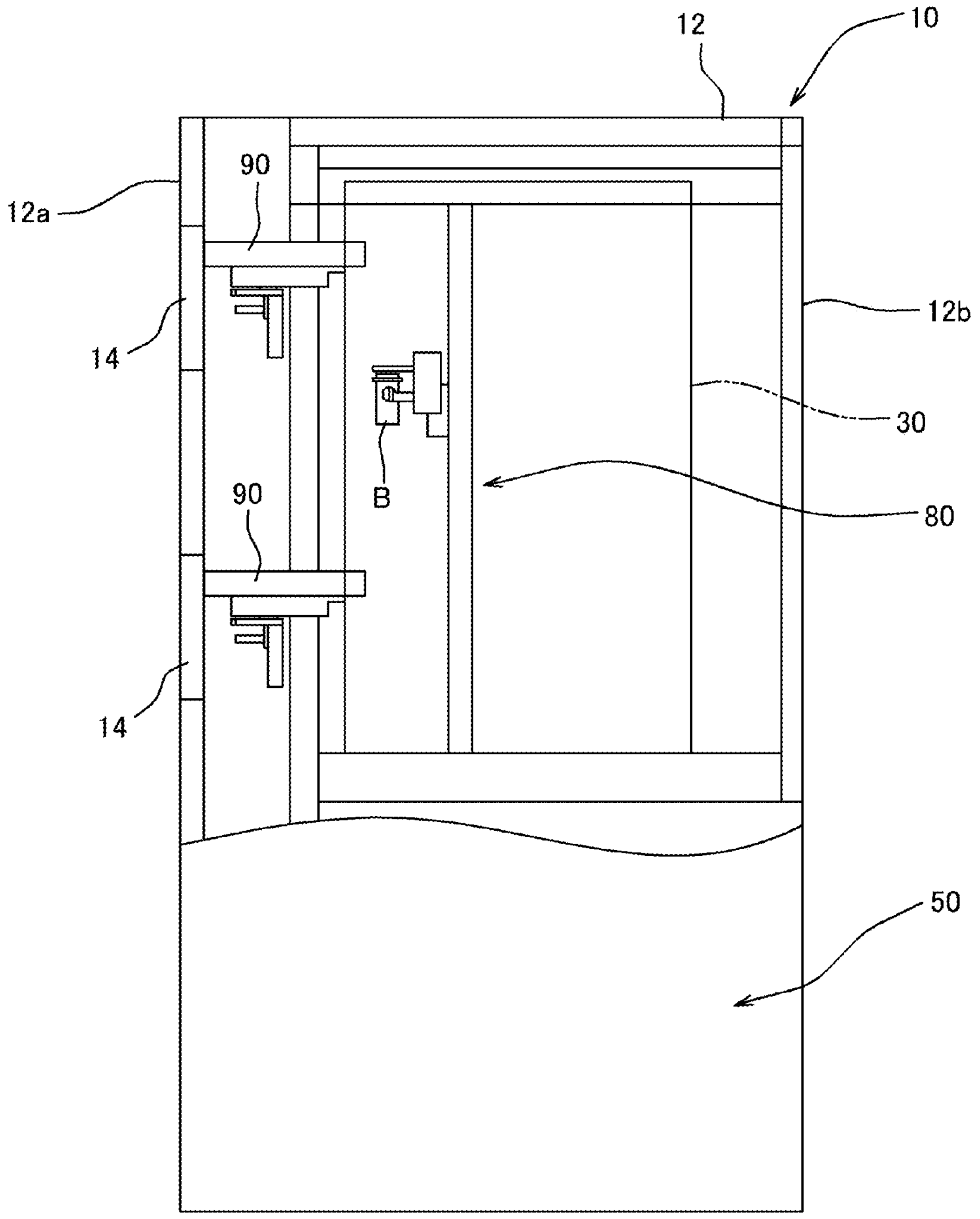
FIG. 4 is a side view showing an internal structure of the medicament dispensing machine shown in FIG. 1.
Figure 5:
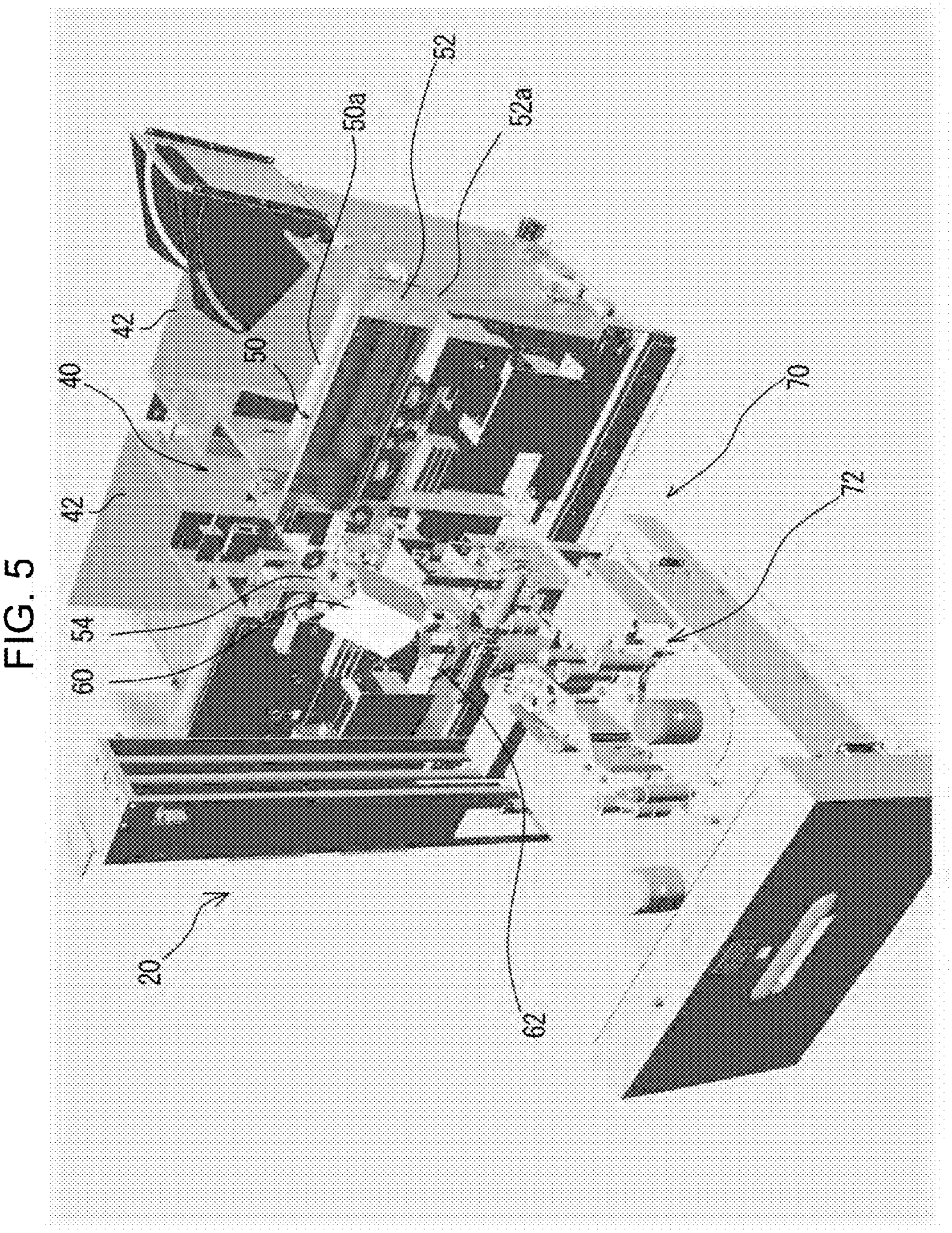
FIG. 5 is a perspective view of a vial feeding unit, a labeling unit, a vial lifter, and their nearby structure in the medicament dispensing machine shown in FIG. 1.
Figure 6:
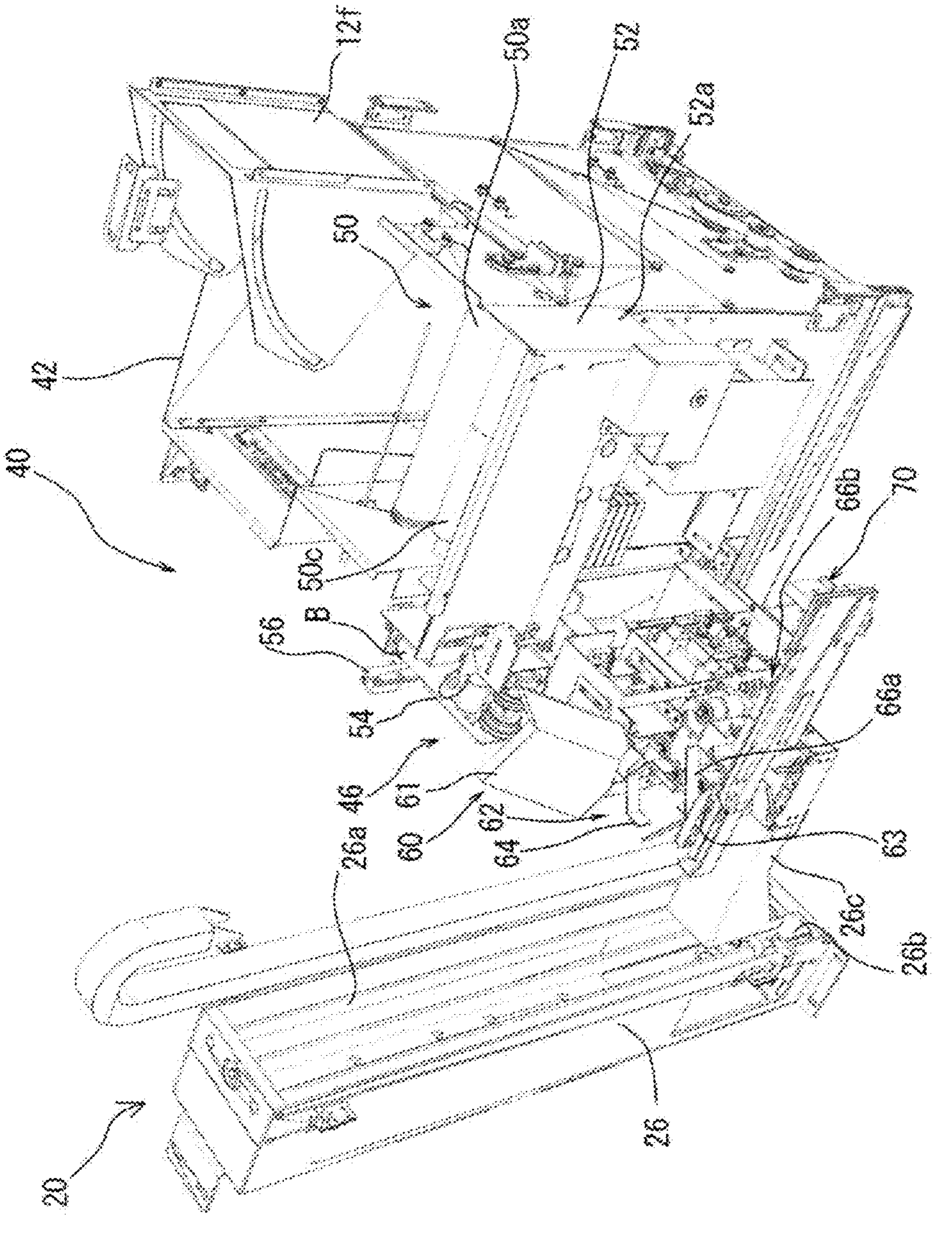
FIG. 6 is a perspective view of the vial feeding unit, the vial lifter and their nearby structure in the medicament dispensing machine shown in FIG. 1.

As shown in FIGS. 5 & 6, the medicament dispensing machine 10 contains a vial lifter 20, a vial supply unit 40 and a labeling unit 70 at the lower part of the body 12. As shown in FIG. 4, in the upper part of the body 12, the medicament dispensing machine 10 contains a transporting unit 80 for transporting the vial B prepared in the bottom part of the body 12 to the tablet supply unit 30, and a discharging unit 90 for discharging the vial B, filled with the medicaments by the tablet supply unit 30, to the user. The configuration of each part is described below.

<<Vial Supply Unit 40>>

Figure 8:
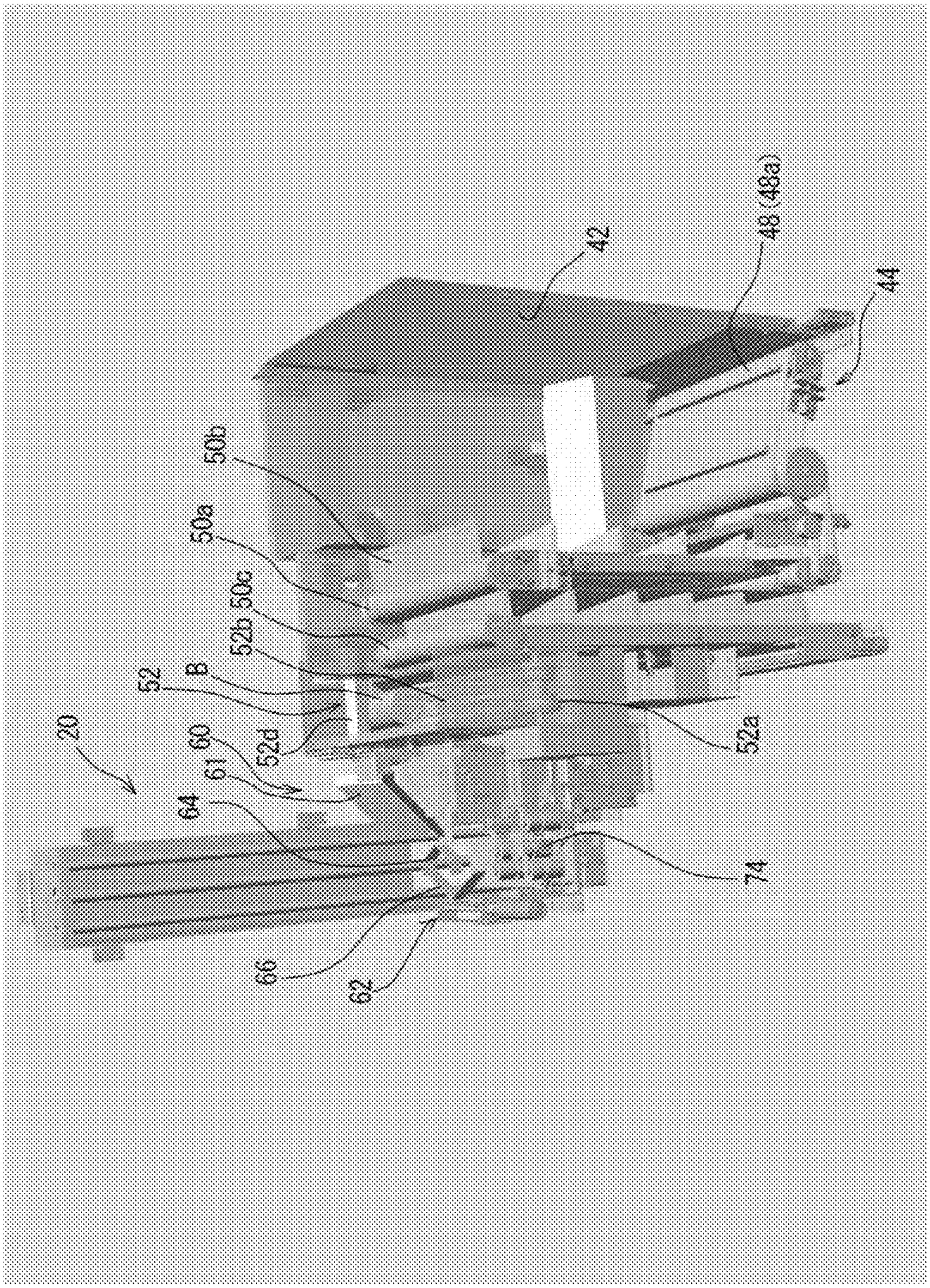
FIG. 8 is a perspective view of the vial feeding unit, the vial lifter, and their nearby structure in the medicament dispensing machine shown in FIG. 1, with some covers removed.

As shown in FIGS. 5, 6 & 8, the vial supply unit 40 contains a stocker 42, a takeout mechanism 44 and a delivery mechanism 46. The stocker 42 is rectangular box-shaped and provided for stocking the vials B. The stocker 42 is provided at the bottom part of the both sides 12*b* and 12*c* of the body 12 and in the rear side 12*d* of the body 12. The stocker 42 can store the vials B loaded through the drawer door 12*f* with their orientation at random. In this embodiment, to prevent from loading wrong-sized vials B into the stocker 42, the medicament dispensing machine 10 is equipped with a comparison means (not shown in the figure), which reads and verifies the bar code printed on the vial B or a box accommodating the vials B. If the bar code is failed to be verified, the drawer door 12*f* is not unlocked, and the vials B cannot be loaded. The unlocking mechanism of the drawer door 12*f* using the verifying means described above is not an essential configuration of the present invention.

The takeout mechanism 44 takes out the vials B randomly loaded in the stocker 42. As shown in FIG. 8, the takeout mechanism 44 contains a conveyor 48, a takeout means 50, and a transfer means 52. The conveyor 48 is constituted with an endless belt 48*a*. The conveyor 48 is installed in the bottom part of the stocker 42 such that it is inclined in the upper direction towards the front side 12*a* of the body 12. By running the conveyor 48, it is possible to move the vials B stored in the stocker 42 to the left side of the figure (to the front side 12*a*) in FIG. 8.

The takeout means 50 takes out and carries up the vials B gathered in the front side 12*a* of the conveyor 48. The takeout means 50 is provided with a drivable endless belt 50*a*, on which paddles 50*b* are fixed at a certain interval. The endless belt 50*a* is provided vertically along the front wall of the stocker 42. By running the takeout means 50, each paddle 50*b* moves in the upper direction sequentially, maintaining its horizontal posture. By the paddle 50*b* moving in the upper direction, the vial B located in the front side 12*a* of the stocker 42 is carried up and taken out from the stocker 42.

As shown in FIG. 8, the transfer means 52 contains a frame 52*a* and a transfer conveyor 52*b*. By running the transfer conveyor 52*b*, the transfer means 52 transfers the vial B taken out by the takeout means 50 to the delivery mechanism 46.

Figure 7:
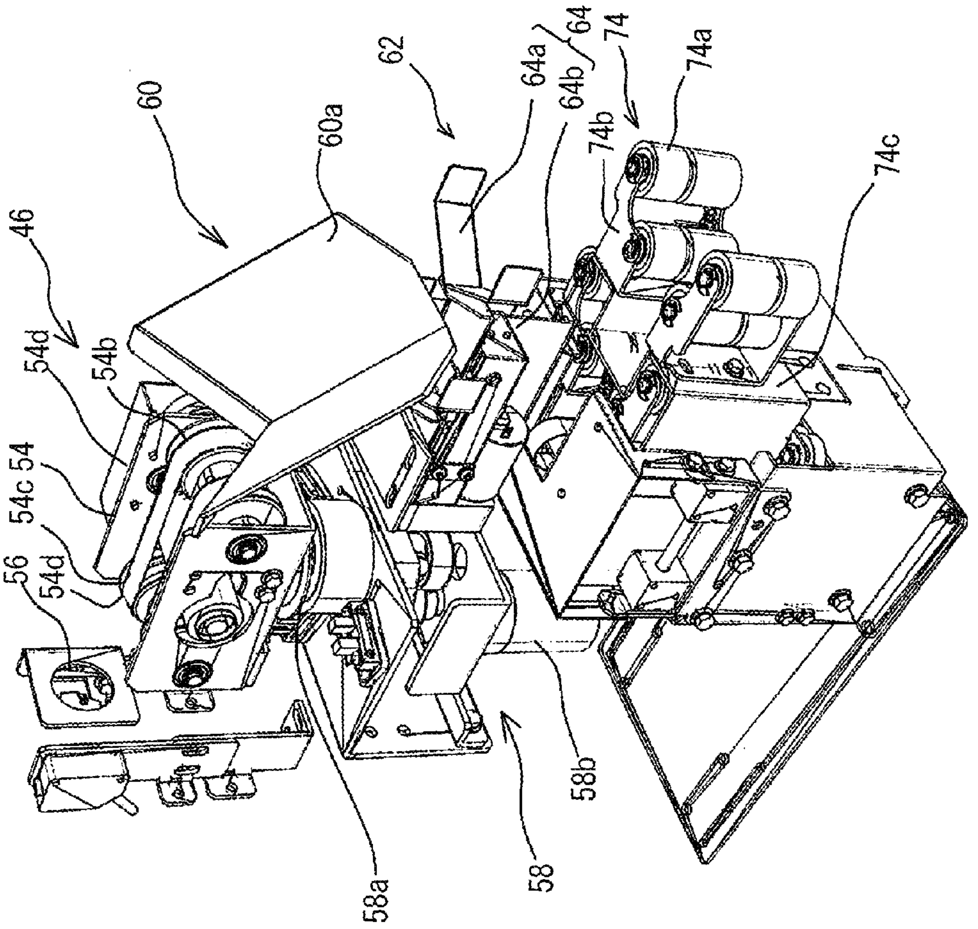
FIG. 7 is a perspective view of a delivery mechanism and its nearby structure of the medicament dispensing machine shown in FIG. 1.

The delivery mechanism 46 erects the vial B transferred by the transfer means 52. Then, the delivery mechanism 46 delivers the vial B to the next process. As shown in FIGS. 5, 6 & 7, the delivery mechanism 46 contains a first conveying means 54, a bottle direction detection means 56, a reversing mechanism 58, a bottle guide means 60, and a bottle erecting means 62.

The first conveying means 54 is provided at a location closer to the middle of the body 12 than the transfer conveyor 52*b* described above. The first conveying means 54 has a structure, in which an endless belt (not shown in the figure) is wound between a pair of pulleys 54*b* and 54*c* mounted on a frame 54*a* with a certain interval. The first conveying means 54 has a structure, in which the frame 54*a* is rotated by the reversing mechanism 58 provided in the bottom, and thereby the conveying direction of the vial B can be changed.

The bottle direction detection means 56 is provided on a rear side of the body 12 with respect to the first conveying means 54 described above, that is in a location opposite to a bottle guide means 60 described later. The bottle direction detection means 56 is composed of a sensor that can detect the bottom of the vial B. And, the bottle direction detection means 56 can detect whether or not the bottom of the vial B provided on the first conveying means 54 is orienting in the direction of the bottle guide means 60. By operating the reversing mechanism 58 based on the detection result brought by the bottle direction detection means 56, the delivery mechanism 46 can deliver the vial B such that the bottom side of the vial B reaches the vial lifter 20 first.

As shown in FIGS. 5-8, the bottle guide means 60 contains an inclined guide 61 made by bending a metal plate, a bottle erecting means 62, and a bottle detection means 63. The inclined guide 61 is made approximately a 'V' shape, and is placed between the first conveying means 54 and the vial lifter 20. The bottle guide means 60 is installed in an orientation sloping downwards such that the vial B can be smoothly slip down from the first conveying means 54 towards the vial lifter 20.

The bottle erecting means 62 makes upright the vial B, which was guided by the inclined guide 61 and loaded on a lifting bench 22 of the vial lifter 20 in an oblique state. The bottle erecting means 62 contains a bottle pressing means 64 and a bottle receiving means 66. The bottle pressing means 64 contains a pressing piece 64*a* and a drive mechanism 64*b*, and is provided below the first conveying means 54 and the inclined guide 61 described above. The pressing piece 64*a* is formed of a metal plate bended such that the shape of the metal plate fits to the shape of the body of the vial B. The drive mechanism 64*b* moves the pressing piece 64*a* in directions in which the pressing piece 64*a* approaches to or moves away from a bottle receiving means 66 described later.

The bottle detection means 63 is provided at a side of the bottle receiving means 66 described above. The bottle detection means 63 detects whether the vial B is loaded on the inclined guide 61. The detection result brought by the bottle detection means 63 is used as a basis for operating the bottle erecting means 62 described above.

The bottle receiving means 66 is arranged at a position facing to the bottle pressing means 64 with a certain gap. The bottle receiving means 66 receives and supports the body of the vial B, which is pressed by the bottle pressing means 64, from the opposite side of the bottle pressing means 64. The bottle receiving means 66 contains a bottle receiving unit 66*a* formed by bending a metal plate, and a receiving unit drive means 66*b* for rotating the bottle receiving unit 66*a*. The receiving unit drive means 66*b* can switch the states of the bottle receiving unit 66*a* between a horizontal state and an erected state, in the former of which the bottle receiving unit 66*a* can receive the vial B.

<<Labeling Unit 70>>

The labeling unit 70 contains a label printer 72 (label pasting means) and a pusher 74. The label printer 72 prints and pastes a label on the outer periphery of the vial B. The label printer 72 is located in a place adjacent to the front side 12*a* of the supply means 60.

Pusher 74 contacts to and pushes the body of the vial B, which is sitting on the lifting bench 22 in an erected state, towards the label printer 72 that is located in front of the supply means 60. The pusher 74 is located below the bottle pressing means 64 described above. The pusher 74 contains four pressing rollers 74*a*, a roller frame 74*b* and a drive mechanism 74*c*. The pressing rollers 74*a* press the vial B.

The roller frame 74*b* pivots the pressing rollers 74*a*. And, the drive mechanism 74*c* moves the roller frame 74*c* in frontward and backward directions, more specifically, in directions of approaching to or moving a way from the vial lifter 20.

<<Vial Lifter 20>>

As shown in FIGS. 5 & 6, the vial lifter 20 contains a lifting bench 22 for accommodating the vial B supplied from the supply means 60, and a lifting mechanism 26 for lifting the lifting bench 22. The lifting bench 22 loads the vial B received from the first conveying means 54 of the delivery mechanism 46 in an approximately erected state. And, the lifting bench 22 moves in upward and downward directions in a space formed between the bottle pressing means 64 and the bottle receiving means 66 described above. The vial lifter 20 can securely hold and support the bottom of the vial B loaded on the lifting bench 22 in the erected state.

As shown in FIGS. 5 & 6, the lifting mechanism 26 is provided in a location adjacent to the lifting bench 22. The lifting mechanism 26 contains a guide rod 26*a* extending in upper and lower directions, and a lifting block 26*b* attached to the guide rod 26*a*. The lifting bench 22 is installed on the lifting block 26*b* via an arm 26*c*. Therefore, if a power is transmitted to the lifting block 26*b* from a power source that is not shown in the drawing, the lifting bench 22 slides in upward and downward directions along the guide rod 26*a* with the lifting block 26. After pasting a label on the vial B with the labeler 70 provided at the bottom of the body 10, by moving the lifting bench 22 in the upward direction, the vial B placed on this lifting bench 22 is transferred to the transporting unit 80.

<<Tablet Supply Unit 30>>

As shown in FIGS. 1 & 2, the tablet supply unit 30 is provided on both sides 12*b* and 12*c* of the body 12 in a location higher than the location where the vial supply unit 40 explained above is located. The tablet supply unit 30 contains tablet cassettes 32, which dispense stored tablets. The medicaments dispensed from the tablet cassettes 32 enter the space between the tablet supply units 30 and 30 provided on both sides 12*b* and 12*c* of the body 12.

<<Transporting Unit 80>>

The transporting unit 80 can deliver the vial B received from the vial lifter 20 into the space between the tablet supply units 30 and 30 provided on both sides (sides 12*b* and 12*c*) of the body 12 with vial B's opening facing upward. By moving the vial B to the dispensing port (not illustrated) of the tablet cassette 32, which is filled with the medicament to be dispensed, by the transporting unit 80, the vial B is filled with the medicament. The transporting unit 80 also transfers the vial B filled with the tablet from the tablet supply unit 30 to the discharging unit 90.

<<Discharging Unit 90>>

Figure 9:
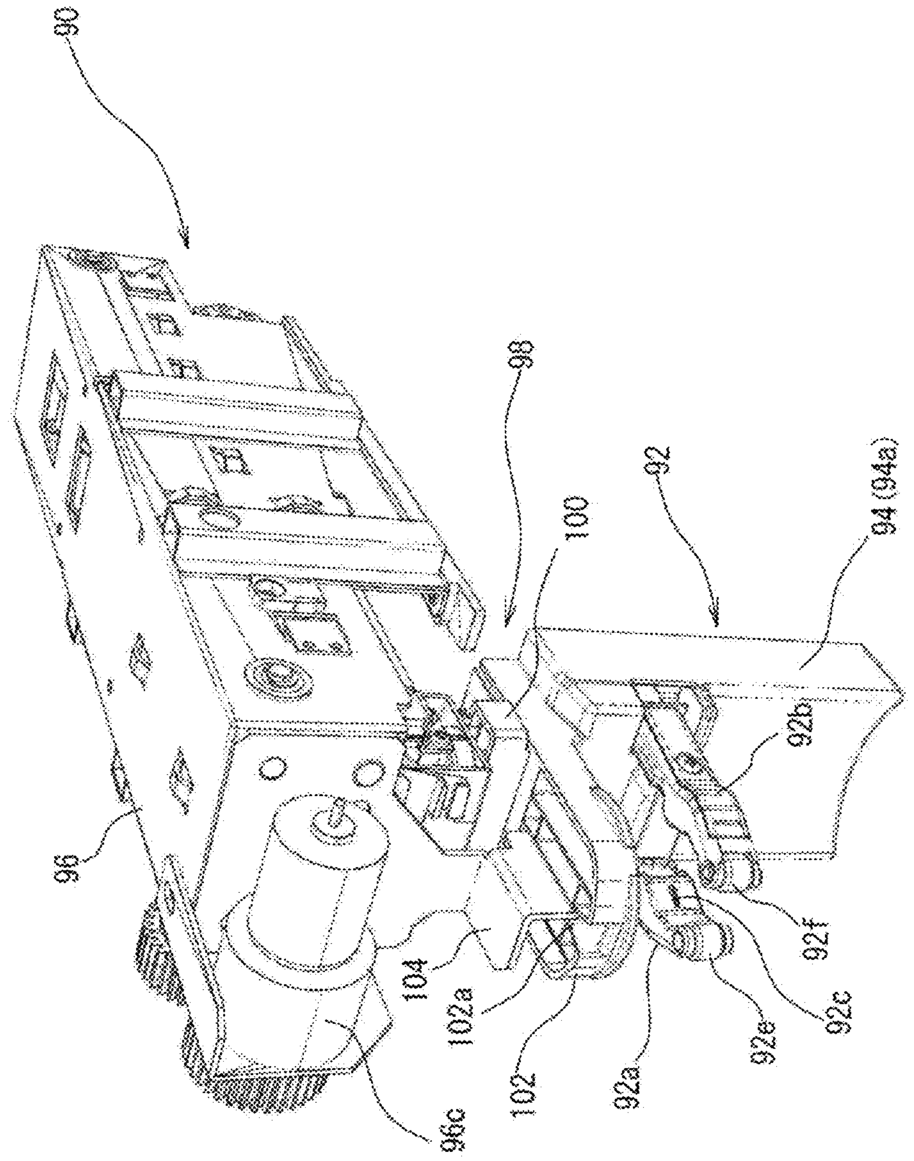
FIG. 9 is a perspective view of a discharging unit.
Figure 10:
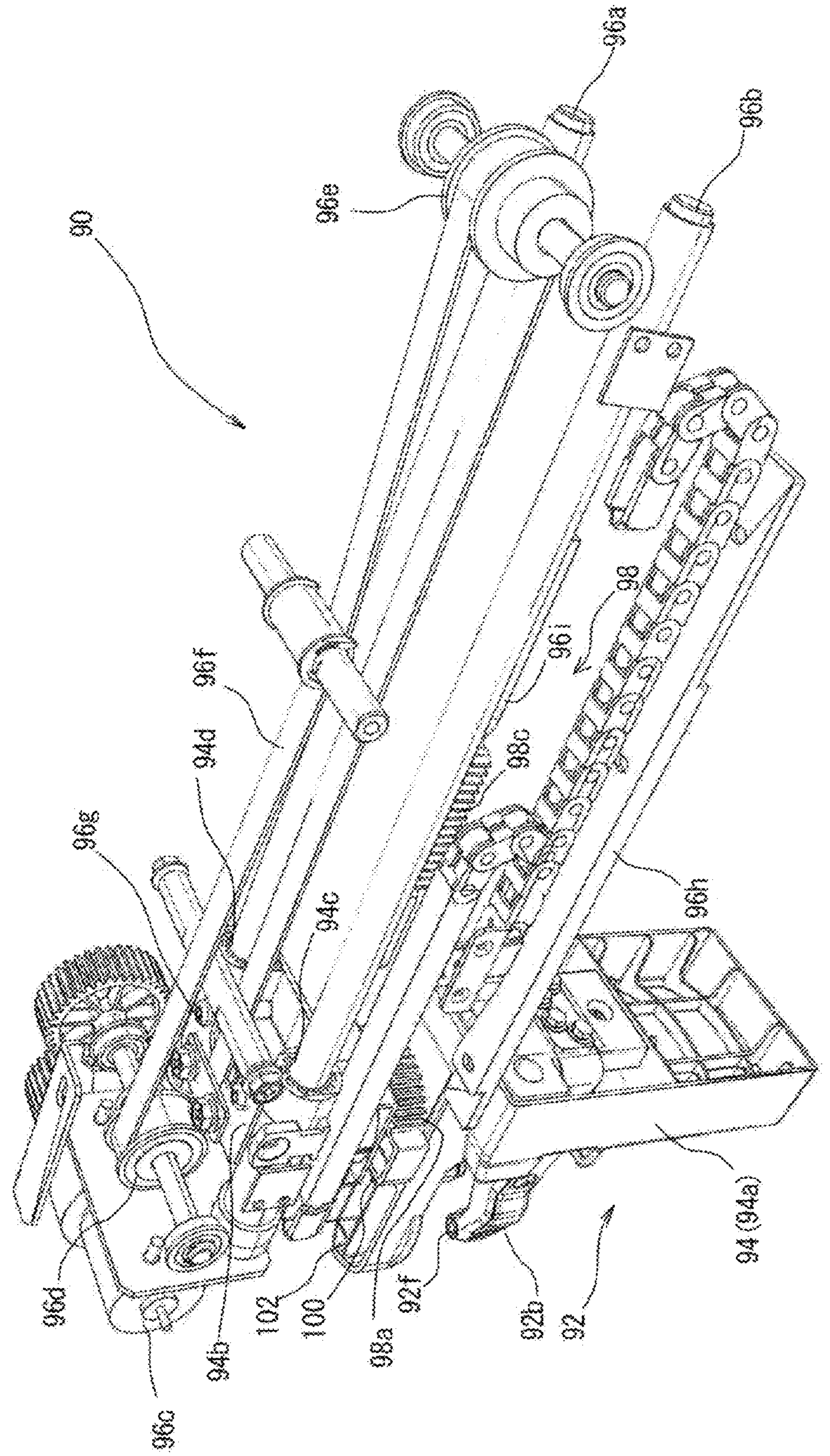
FIG. 10 is a perspective view of the discharging unit depicting the internal structure of a moving means.

The discharging unit 90 supplies and discharges the vial B transferred from the transporting unit 80 to the vial discharging window 14. As shown in FIGS. 9 & 10, the discharging unit 90 contains a vial gripping means 92, a body of gripping means 94, a moving means 96, and an orientation changing mechanism 98. The vial gripping means 92 receives and grips the vial B, filled with the medicament by the tablet supply unit 30, from the transporting unit 80. The vial gripping means 92 contains a pair of gripping arms 92*a* and 92*b*.

The gripping arms 92*a* and 92*b* are the parts having arm shapes. The gripping arms 92*a* and 92*b* are installed on the body of gripping means 94 so as to be symmetric in left and right with respect to the body of gripping means 94. In the state where the gripping arms 92*a* and 92*b* are not gripping the vial B, the gap between the gripping arms 92*a* and 92*b* is smaller than the outer diameter of the smallest vial of the vials B expected to be used. The gripping arms 92*a* and 92*b* can bend in the direction in which the gap between them widens. Therefore, when the vial B is inserted between the gripping arms 92*a* and 92*b*, the gripping arms 92*a* and 92*b* bend in the direction in which they become more distant from each other. Thereby, the vial B is tightly gripped.

Contact type switches 92*c* and 92*d* are provided on the gripping arms 92*a* and 92*b* on the surface facing inside, more specifically the portion (contact portion) that contacts to the body of the vial B when the gripping arms 92*a* and 92*b* grip the vial B. These switches 92*c* and 92*d* are used for detecting whether the gripping arms 92*a* and 92*b* have gripped the vial B. The switches 92*c* and 92*d* are electrically connected to a controller (not shown in the drawing) of the medicament dispensing machine 10.

When the vial B is gripped and the body of the vial B is in contact with the switches 92*c* and 92*d*, both the switches 92*c* and 92*d* become ON, and it is confirmed that the vial B is gripped. In the case either of the gripping arms 92*a* and 92*b* is broken and cannot grip the vial B, either of the switches 92*c* and 92*d* will not become ON and the existence of the vial B will not be detected. In such a situation, if the vial B is transferred to the gripping arms 92*a* and 92*b*, the vial B will not be securely gripped. It is expected that the vial B may fall inside of the machine and the medicaments may be spilled. Therefore, in this embodiment, upon detections by both the switches 92*c* and 92*d*, the receiving of the vial B from the transporting unit 80 is confirmed. Although such a control mechanism is not essential in the present invention, it is preferable to configure some means to avoid the failure of receiving the vial B.

Figure 12:
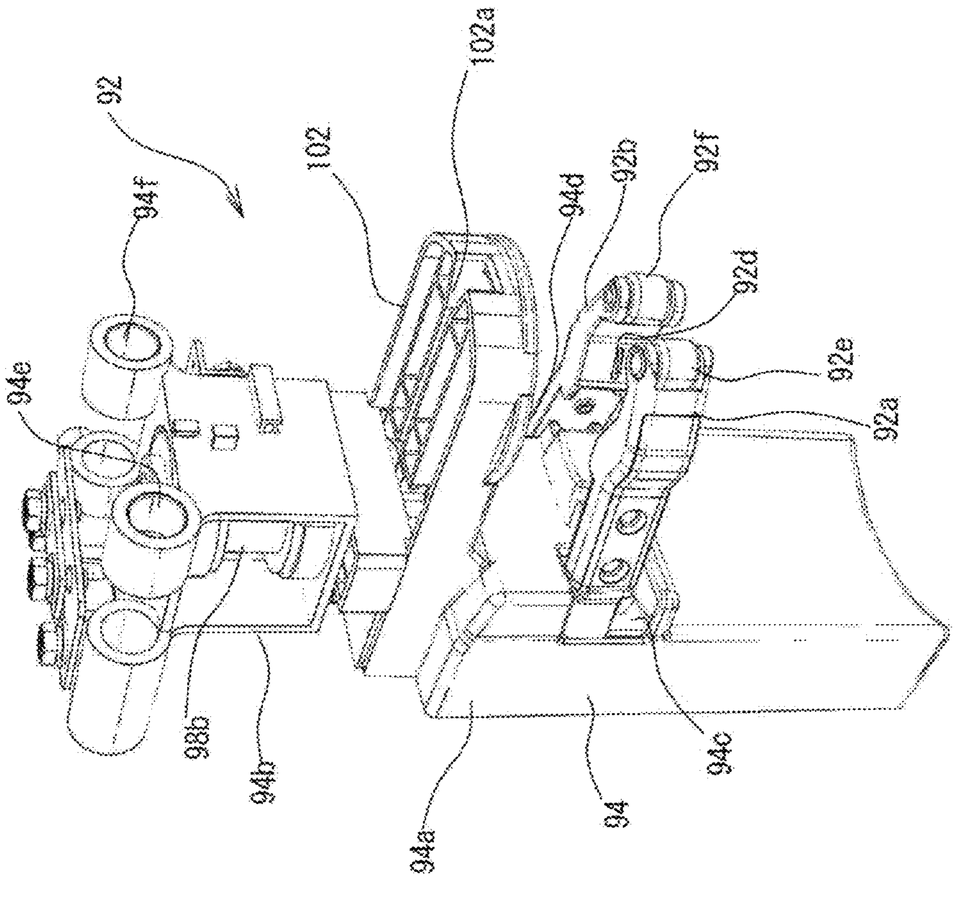
FIG. 12 is a perspective view of the vial gripping means viewed from a front side.
Figure 13:
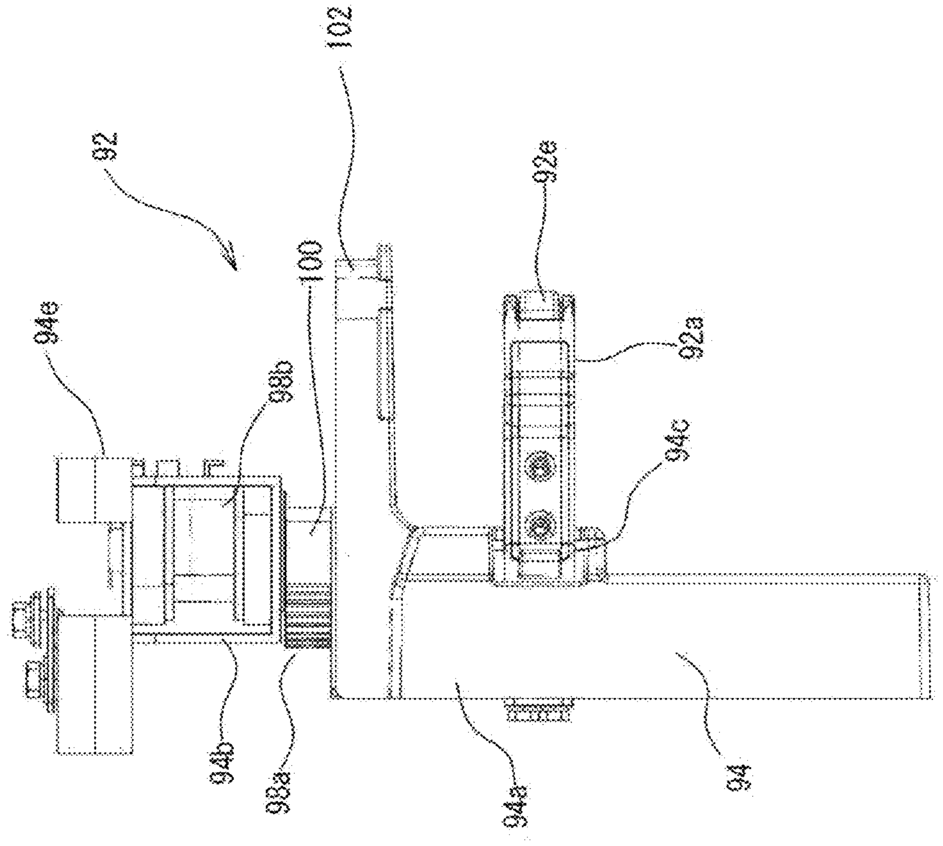
FIG. 13 is a side view of the vial gripping means.
Figure 14:
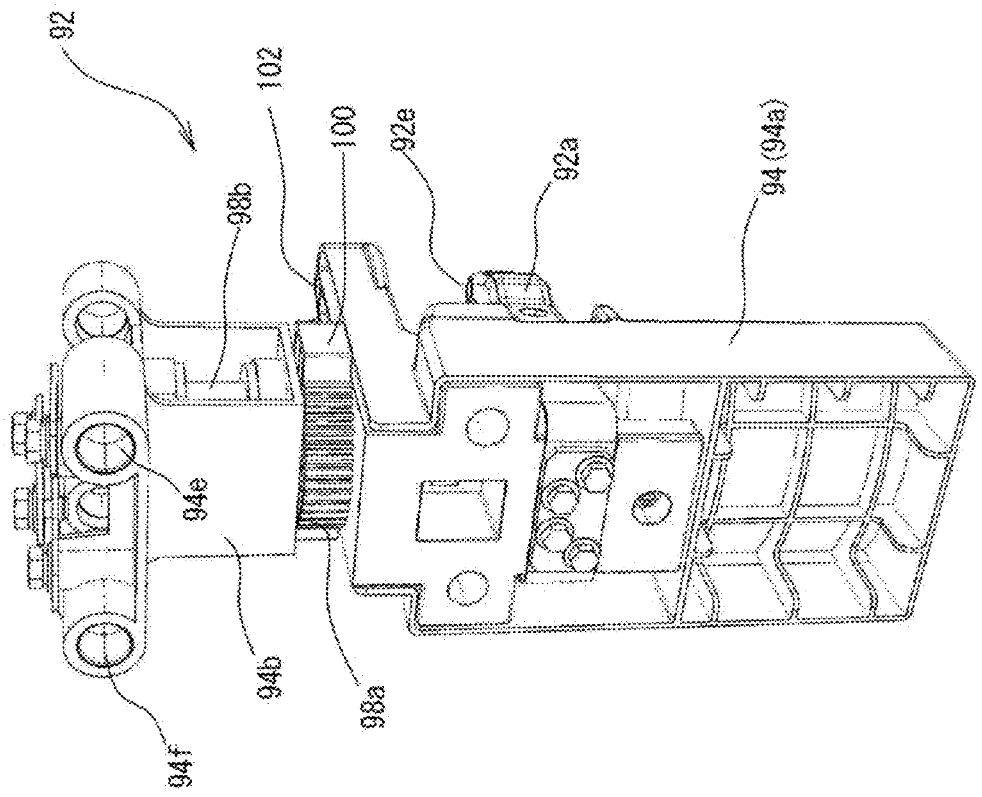
FIG. 14 is a perspective view of the vial gripping means viewed from a rear side.

As shown in FIGS. 12-14, gripping rollers 92*e* and 92*f* (rotating members) are provided at the end of the gripping arms 92*a* and 92*b*. The gripping rollers 92*e* and 92*f* are installed such that the gripping rollers 92*e* and 92*f* can freely rotate with respect to the gripping arms 92*a* and 92*b* respectively. The gripping rollers 92*e* and 92*f* can rotate along the body of the vial B when the vial B is inserted and removed between the gripping arms 92*a* and 92*b*.

The body of gripping means 94 is a member made of resin, and contains an arm installation section 94*a* on which the gripping arms 92*a* and 92*b* described above are installed, and a moving means connection section 94*b* that connects to the moving means 96. Further, at the top of the arm installation section 94*a*, a gear 98*a* (pinion), which is a part of the orientation changing mechanism 98, and a connecting shaft 98*b* are provided as a single body. Further, at both sides of the gear 98 are provided contact portions 100 and 100. On the upper part of the arm installation section 94*a*, an eaves 102 is provided. On this eaves 102, an engaging groove 102 (first engaging means) is provided.

The arm installation section 94*a* has a size to be accommodated in the vial discharging window 14 described later. On both sides of the arm installation section 94*a* are formed arm insertion holes 94*c* and 94*d* for inserting the gripping arms 92*a* and 92*b*. The gripping arms 92*a* and 92*b* are attached to the body of gripping means 94 by inserting the gripping arms 92*a* and 92*b* in the arm insertion holes 94*c* and 94*d* so as to project approximately horizontally from the front side of the arm installation section 94*a*, and by fixing the end portions of the arms 92*a* and 92*b* on the arm installation section 94*a* with screws from the back.

Figure 11:
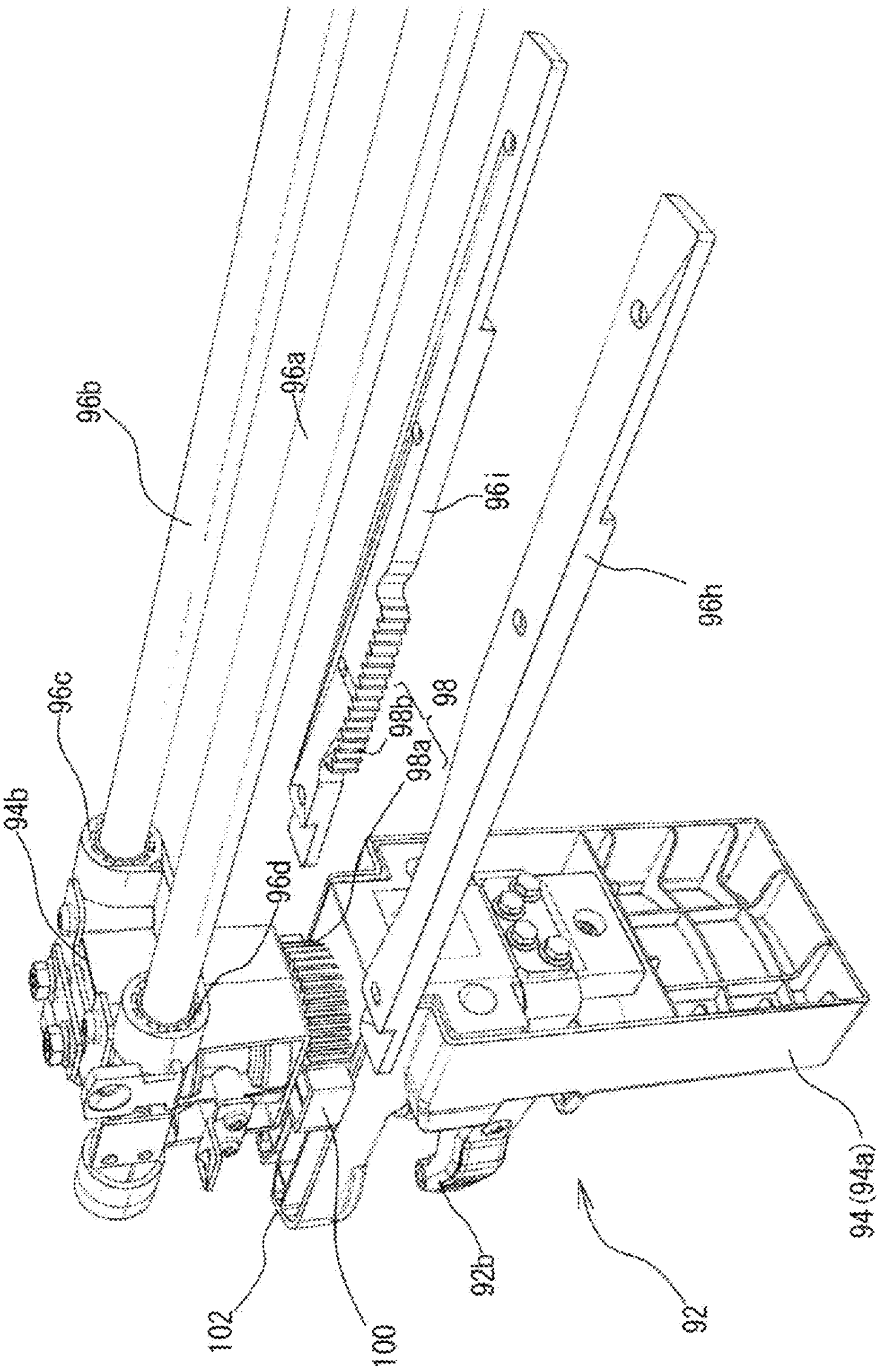
FIG. 11 is a perspective view of a vial gripping means.

The moving means connecting section 94*b* contains shaft insertion holes 94*e* and 94*f*. As shown in FIGS. 10 & 11, the shaft insertion holes 94*e* and 94*f* are the sections in which a support shaft 96*a* that constitutes the moving means 96 is inserted.

Figure 17:
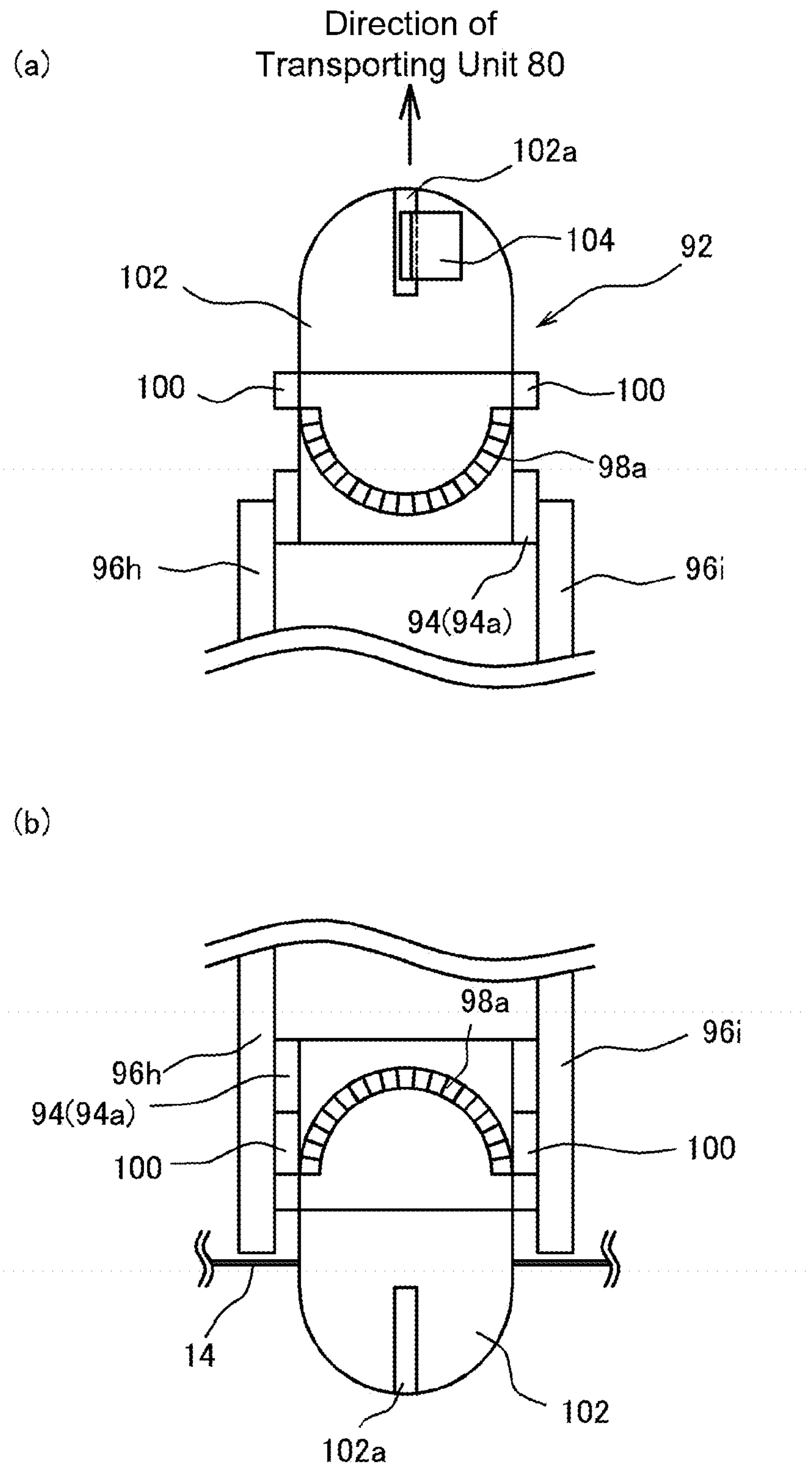
FIG. 17 (*a*) is a schematic diagram showing that the vial gripping means is positioned at a side of a transporting unit, and (*b*) is a schematic diagram showing that the vial gripping means is positioned at a side of the vial discharging window.

As shown in FIGS. 9-14 & 17, the contact portions 100 are provided on both sides of the gear 98*a*. More specifically, the contact portions 100 are provided at places adjacent to left and right sides of the gear 98*a* when viewed from the front (or the back) of the body of gripping means 94. As shown in FIG. 17, the contact portions 100 and 100 are the sections that contact to internal sides of guide pieces 96*h* and 96*i* and slide along the guide pieces 96*h* and 96*i*. The contact portions 100 and 100, in combination with the guide pieces 96*h* and 96*i*, function as a position determination means to determine the left-right position (horizontal position) of the vial gripping means 94 when the vial B is discharged (dispensed) in the vial discharging windows 14*a*-14*c* (see FIG. 17 (*b*)). Therefore, in the medicament dispensing machine 10 of this embodiment, when the vial B is discharged (dispensed) in the vial discharging windows 14*a*-14*c*, the vial gripping means 94 is always fixed at a certain position with a constant posture.

As shown in FIGS. 9-14 & 17, eaves 102 has a shape of eaves and is provided on the top side of the body of gripping means 94 as explained above. The engaging groove 102 is provided on the upper surface of the eaves 102. As a combination with an engaging piece 104 (the second engaging means) described later, the engaging groove 102 functions as a position determination means to determine the left-right position (horizontal position) of the vial gripping means 94 when the vial gripping means 94 receives (transfers) the vial B from the transporting unit 80 (see FIG. 17(*a*)). The engaging groove 102 is formed such that it is extended from the front side to the rear side when viewed from the front side of the body of gripping means 94 (direction in which the gripping arms 92*a*, 92*b* project). Once the engaging piece 104 (second engaging means) later described is inserted in the engaging groove 102, the position and orientation of the body of gripping means 94 is fixed in left-right (horizontal) direction.

As shown in FIGS. 9-11, the moving means 96 is placed above the body of gripping means 94. The moving means 96 contains the shafts 96*a* and 96*b* described above, a motor 96*c*, pulleys 96*d* and 96*e*, a belt 96*f*, connecting pieces 96*g*, and guide pieces 96*h* and 96*i*. The shafts 96*a* and 96*b* are provided so that they extend approximately horizontally from the transporting unit 80 to the vial discharging window 14 provided in the front side 12*a* of the body 12. The shafts 96*a* and 96*b* are respectively inserted in shaft insertion holes 94*e* and 94*f* provided on the body of gripping means 94 described above. Thereby, the body of gripping means 94 can move along the shafts 96*a* and 96*b* between the transporting unit 80 and the vial discharging window 14.

Motor 96*c* functions as a drive source for the moving means 96. It is installed so as to transmit a power to the pulley 96*d*. The pulleys 96*d* and 96*e* are pivoted so as to freely rotate in the locations adjacent to the transporting unit 80 and the vial discharging window 14. The belt 96*f* is wound between the pulleys 96*d* and 96*e*. The body of gripping means 94 described above is connected to the belt 96*f* via the connecting piece 96*g*. Once the motor 96*c* is started, the belt 96*f* wound between the pulleys 96*d* and 96*e* is driven, and the body of gripping means 94 is moved between the transporting unit 80 and the vial discharging window 14.

The guide pieces 96*h* and 96*i* are members provided so as to extend approximately horizontally from the transporting unit 80 to the discharging window 14 like the shafts 96*a* and 96*b* explained above. The guide pieces 96*h* and 96*i* are installed at a location approximately as high as where the gear 98 is installed. One of the guide pieces 96*h* and 96*i* (the guide piece 96*i* in this embodiment) has a rack gear 98*c* in the middle in its longitudinal direction. By moving the body of gripping means 94 between the transporting unit 80 and the vial discharging window 14, the gear 98*a* provided on the body of gripping means 94 engages with the rack gear 98*c*. Thereby, a rotational force for rotating the body of gripping means 94 is produced.

The orientation changing mechanism 98 reverses the direction of the body of gripping means 94 while the body of gripping means 94 moves between the transporting unit 80 and the vial discharging window 14. The orientation changing mechanism 98 contains a gear 98*a* and a connecting shaft 98*b* provided on the body of gripping means 94, and a rack gear 98*b* provided on the guide piece 96*i* of the moving means 96. The orientation changing mechanism 98 works by the engagement of the gear 98*a* and the rack gear 98*b* while the body of gripping means 94 moves between the transporting unit 80 and the vial discharging window 14.

As explained above, the gear 98*a* and the rack gear 98*b* are formed as a single body with the body of gripping means 94. If the body of gripping means 94 moves towards the vial discharging window 14, the gear 98 and the rack gear 98*b* engage with each other. Thereby, the body of gripping means 94 revolves (is reversed) around the connecting shaft 98*b* along with the gear 98*a*, and the gripping arms 92*a* and 92*b* face in the direction of outside of the vial discharging window 14. On the other hand, if the body of gripping means 94 moves towards the transporting unit 80, the body of gripping means 94 revolves (is reversed) around the connecting shaft 98*b* in a direction opposite to the direction described above. Thereby, the gripping arms 92*a* and 92*b* face to the transporting unit 80, and it is possible to receive the vial B readied in the transporting unit 80.

In this embodiment, the engaging piece 104 is provided at a front side of the transporting unit 80 (tablet supply unit 30). The engaging piece 104 is a piece-like member provided at a location where it is possible to engage with the engaging groove 102*a* provided on the eaves 102 explained above. Specifically, the engaging piece 104 is provided as a cantilever at a front side of the tablet supply unit 30, or a rear side 12*d* of the moving means 96. The engaging piece 104 is installed at a location where it can engage with the engaging groove 102*a* when the body of gripping means 94 reaches the location for receiving the vial B from the transporting unit 80 (side of the tablet supply unit 30). If the engaging piece 104 is inserted into the engaging groove 102*a*, the position of the body of gripping means 94 is determined in the left-right (horizontal) direction. And, the orientation of the body of gripping means is fixed when the vial B is transferred from the transporting unit 80 to the discharging unit 90.

<<Vial Discharging Window 14>>

As described in the above-mentioned embodiment and FIG. 4, the medicament dispensing machine 10 includes the transporting arms 82 and 84 in the transporting unit 80, and the gripping arms 92*a* and 92*b* in the discharging unit 90. The transporting arms 82 and 84 in the transporting unit 80 transfer the vial B to the gripping arms 92*a* and 92*b* in the discharging unit 90. The gripping arms 92*a* and 92*b* in the discharging unit 90 receive a command from a controller in the medicament dispensing machine 10, and perform the transfer of the vial B with an instruction included in the command. Specifically, the controller in the medicament dispensing machine 10 issues commands based on different kinds of action plans such as, for example, discharging, cleaning, stocking or maintenance. As an example, in the case of the discharging action plan, the controller in the medicament dispensing machine 10 issues unlock command which discharges the vial B through the vial discharging windows after the controller determines whether the person has access authorization using a user information which is inputted via the input device. Moreover, the input device is presented by the operating panel 16 or the bar code reader 18*a*, where a user can input data through those input devices.

Here, the unlock command may be issued to persons who only have access permit code to pick up the vial B from the medicament dispensing machine 10. Alternatively, the unlock command may be only issued to the person who initiated inputting data to the input device for filing tablets into the vial B. Furthermore, the unlock command may be only issued to the person who initiated inputting data to the input device for filing tablets into the vial B, and who also has access permit code to pick up the vial B from the medicament dispensing machine 10. In the latter case, the medicament dispensing machine 10 identifies whether the same person who initiated inputting data to the input device, and also identifies whether the medicament dispensing machine 10 received the initiation data for filing tablets into the vial B inputted by the operating panel 16 or the bar code reader 18*a*. With this configuration, it becomes possible to provide collected medicine to the person who initiated the collection command with no errors.

In other embodiments, the transporting arms 82 and 84 in the transporting unit 80 transfer the vial B to a storage area (not shown in the figure) which is formed between the transporting arms 82 and 84 in the transporting unit 80 and the gripping arms 92*a* and 92*b* in the discharging unit 90. The controller in the medicament dispensing machine 10 issues a command that allows the transporting arms 82 and 84 in the transporting unit 80 to move the vial B toward the storage area, and then issues unlock command to discharge the vial B by the gripping arms 92*a* and 92 in the discharging unit 90 from the storage area through the vial discharging windows.

In greater detail, the storage area has separate delivery tables where the transporting arms 82 and 84 move the vial B, and the holding members hold temporarily the vials filled with the medicament. Thereafter, the gripping arms 92*a* and 92*b* move the vial B toward the vial discharging windows for discharging. This configuration allows for efficient multitasking such as, for example, filling pills into one vial B and discharging another vial B at the same time, within one medicament dispensing machine 10. In this embodiment, the storage area has one delivery table and five holding members. In particular, after filling pills into the vial B, the transporting arms 82 and 84 from the transporting unit 80 move the vial B to the delivery table which is formed in the discharging unit 90, and the gripping arms 92*a* and 92*b* from the discharging unit 90 move the vial B to one of five holding members to stand by for next unlock command. The controller in the medicament dispensing machine 10 issues commands instructing the gripping arms 92*a* and 92*b* in the discharging unit 90 to move the vial B to any one of five holding members.

The holding members are formed in the discharging unit 90 and may include cameras for verifying inside of the vial B by users before the vial B is discharged. The controller in the medicament dispensing machine 10 issues unlock command by inputting data from the operating panel 16 or the bar code reader 18*a*, and the gripping arms 92*a* and 92*b* in the discharging unit 90 move the vial B from the holding member to the vial discharging windows for discharging.

Figure 15:
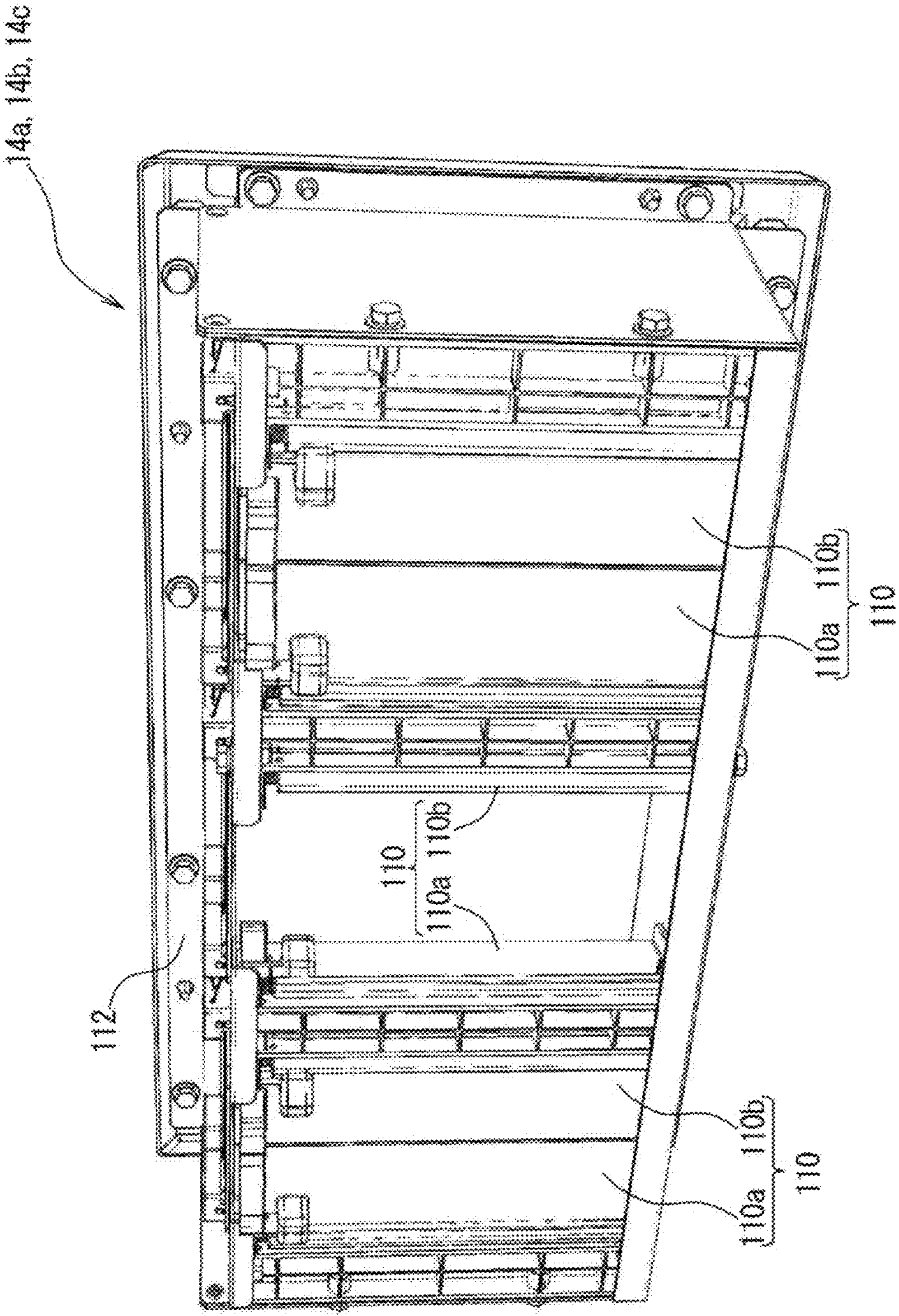
FIG. 15 is a perspective view of a vial discharging window viewed from a front side.
Figure 16:
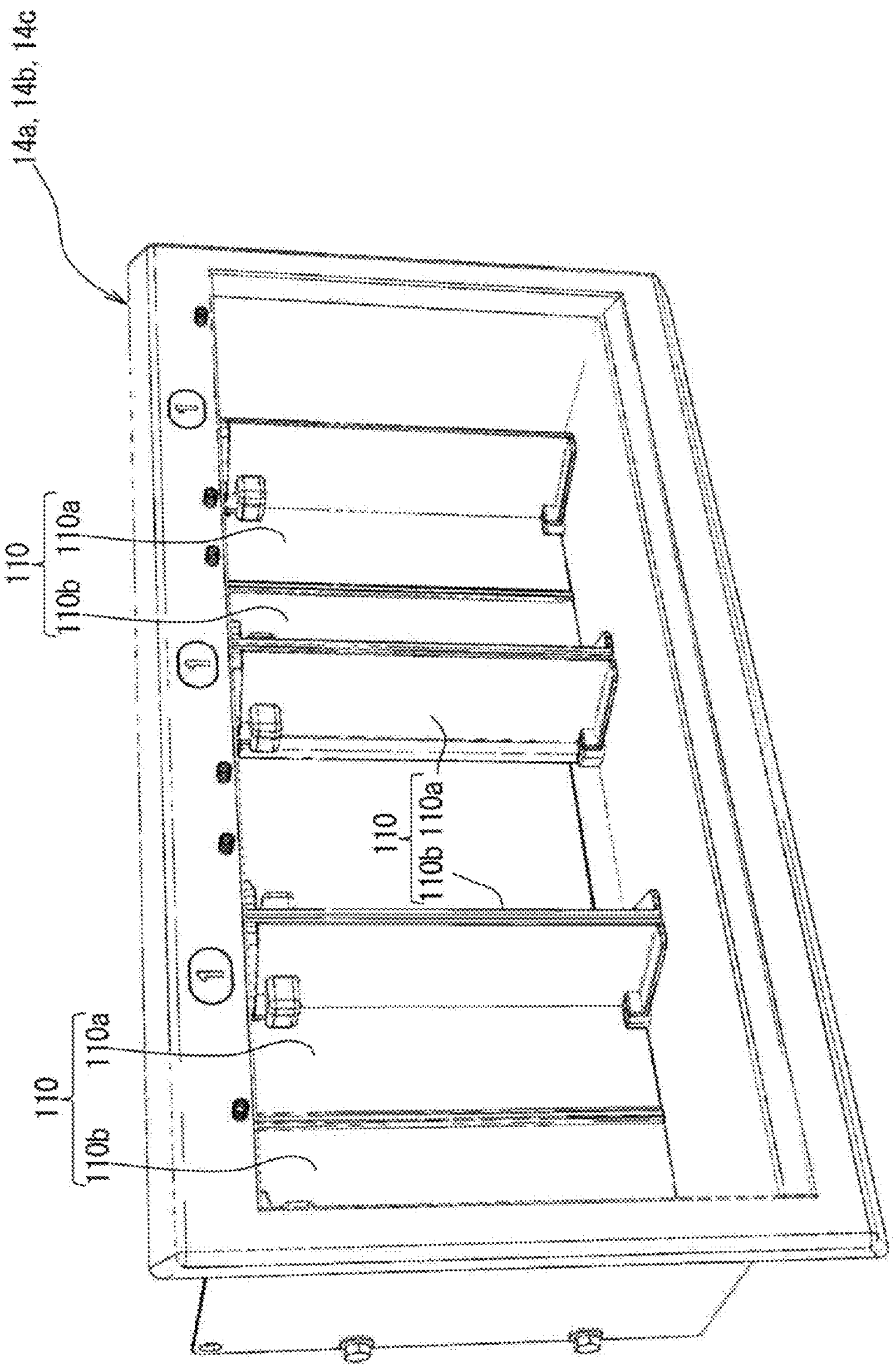
FIG. 16 is a perspective view of the vial discharging window viewed from a rear side.

As shown in FIGS. 15 & 16, the vial discharging windows 14*a*-14*c* contain three doors 110. The doors 110 are provided side-by-side in the width direction of the body 12 in a substantially rectangular frame 112 that constitutes the vial discharging windows 14*a*-14*c*. The door 110 is in the form of so-called double door in which two door plates 110*a* and 110*b* are installed on the frame 112 by hinges.

The door 110 is arranged such that it can be opened by being pressed from the inside of the body 12 to the outside. By moving the vial gripping means 92 of the discharging unit 90 described above to the vial discharging windows 14*a*-14*c*, the gripping arms 92*e* and 92*f* press the doors 110*a* and 110*b* from inside of the body 12 and the doors 110*a* and 110*b* open (see FIG. 9). Thereby, the vial B gripped by the gripping arms 92*a* and 92*b* attached to the body of gripping means 94 is exposed out of the vial discharging windows 14*a*-14*c*. The door plates 110*a* and 110*b* are biased by springs in the direction of closing the vial discharging windows 14*a*-14*c*. Therefore, by retracting the body of gripping means 94*c* from the outside of the vial discharging windows 14*a*-14*c* to the side of the transporting unit 80, the door plates 110*a* and 110*b* of the vial discharging windows 14*a*-14*c* are closed.

<<Action of Medicament Dispensing Machine 10>>

The medicament dispensing machine 10 of this embodiment features actions of transferring the vial B from the tablet supply unit 30, where the vial B is filled with the medicament, through the transporting unit 80 and thorough the discharging unit 90 to the vial discharging windows 14*a*-14*c*, where the vial B is discharged. The action of the medicament dispensing machine 10 is described in detail hereinafter. If it is ready to fill the vial B with the medicament and dispense it, first the takeout means 50 and the first conveying means 52 starts. The vial B is taken out from the stocker 42 and transferred to the first conveying means 54. During this time, the first conveying means 54 is set as a state (state for receiving) in which the orientation of the frame 54*a* is adjusted so that the conveying direction becomes the same as the transferring direction of transfer conveyor 52*b*. Also, the pulleys 54*b* and 54*b* are driven. Thereby, the vial B taken out from the stocker 42 is sent to the first conveying means 54 from the transfer means 52.

Once the vial B is sent to the first conveying means 54, the reverse mechanism 58 is activated based on necessity, and the bottom of the vial B orients in the direction of the bottle guide means 60. In this state, the first conveying means 54 is again driven, and the vial B is supplied to the bottle guide means 60. Thereby, the vial B is erected, with its bottom orienting in the downward direction, on the lifting bench 22 of the vial lifter 20 adjacent to the bottle guide means 60. Subsequently, the lifting bench 22 is lowered. And, a label is pasted on the body of the vial B in the labeling unit 70 provided below the bottle guide means 60.

Once the pasting of the label on the vial B is completed, the vial lifter 20 runs again, and the lifting bench 22 moves upward in the body 12. Subsequently, the empty vial B is transferred to the transporting unit 80, and a certain medicament is filled in the vial B. Once the filling of the medicament into the vial B is complete, the vial B is moved to the discharging unit 90 by the transporting unit 80.

In the discharging unit 90, the body of gripping means 94 are retracted inside the body 12, and the gripping arms 92*a* and 92*b* project towards the transporting unit 80 (rear side 12*d*). The vial B transported by the transporting unit 80 is inserted and gripped between the gripping arms 92*a* and

92*b*. If the switches 92*c* and 92*d* provided on the gripping arms 92*a* and 92*b* become ON, it is confirmed that the vial B is gripped, and the transfer of the vial B from the transporting unit 80 to the gripping arms 92*a* and 92*b* is completed. Subsequently, the motor 96*c* of the moving means 96 is initiated. Thereby, the body of gripping means 94 moves along the shafts 96*a* and 96*b* and the guide pieces 96*h* and 96*i* towards the vial discharging windows 14*a*-14*c*.

As explained above and as shown in FIG. 17 (*a*), upon the transfer of the vial B from the transporting unit 80 to the vial gripping means 92, the engaging piece 104 gets into and becomes engaged with the engaging groove 102*a* provided on the eaves 102 of the body of gripping means 94. Thereby, the left-right (horizontal) location of the body of gripping means 94 is determined. Therefore, upon the transfer of the vial B from the transporting unit 80 to the vial gripping means 92, failure of the transfer of the vial B is well prevented. Furthermore, even after receiving the vial B, the body of gripping means 94 slides, being supported by the guide pieces 96*h* and 96*i*. Thus, horizontal shaking of the vial B is well prevented, and the vial B is stably transported to the vial discharging window 14.

While the body of gripping means 94 is moving, the gear 98*a* provided on the body of gripping means 94 becomes engaged with the rack gear 98*c* provided on the guide piece 96*i* in the middle of the path from the transporting unit 80 to the vial discharging windows 14*a*-14*c*. In this situation, as the body of gripping means 94 moves towards the vial discharging windows 14*a*-14*c*, the body of gripping means 94 revolves around the connecting shaft 98*b*, and the gripping arms 92*a* and 92*b* orients in the direction of the vial discharging windows 14*a*-14*c*. After the body of gripping means 94 further moves toward the vial discharging windows 14*a*-14*c*, the door plates 110*a* and 110*b* are pressed and opened by the gripping arms 92*a* and 92*b*. Then, the gripping arms 92*a* and 92*b* go out of the door 110, gripping the vial B.

As shown in FIG. 17 (*b*), in the state where the body of gripping means 92 has reached the vial discharging windows 14*a*-14*c*, the contact portions 100 and 100 are in contact with the surface of the guide pieces 96*h* and 96*i* facing inside. Thereby, the position of the body of gripping means 94 is determined in left-right directions (horizontal direction). Therefore, even while dispensing (discharging) the vial B, the body of gripping means 92 maintains its constant orientation. Thus, dispensing failure of the vial B (discharging failure) due to the positioning failure of the body of gripping means 92 is well prevented.

As explained above, once the vial B is exposed outside of the vial discharging windows 14*a*-14*c*, the vial B is ready to be pulled out from the gripping arms 92*a* and 92*b*. If the switches 92*c* and 92*d* become OFF and it is confirmed that the vial B is taken out from the gripping arms 92*a* and 92*b*, the motor 96*c* of the transfer means 96 described above begins to drive in a direction opposite to the direction described above. Thereby, the body of gripping means 94 retracts towards the inside of body 12 (direction toward the transporting unit 80). Once the body of gripping means 94 reaches the location where the rack gear 98*c* is provided on the guide piece 96*i*, the gear 98*a* provided on the body of gripping means 94 engages with the rack gear 98*c*. As the body of gripping means 94 further moves in the direction of the transporting unit 80, the body of gripping means 94 revolves around the connecting shaft 98 in a direction opposite to the direction described before. Thereby, the gripping arms 92*a* and 92*b* project toward the transporting unit 80. As a result, the gripping arms 92*a* and 92*b* become ready to receive a next vial B from the transporting unit 80.

The medicament dispensing machine 10 of this embodiment can make the vial B held between the pair of gripping arms 92*a* and 92*b* provided in the vial gripping means 92. Therefore, in the medicament dispensing machine 10 of this embodiment, the vial gripping means 92 can receive and grip the medicament-filled vial B from the transporting unit 80 and transport to the vial discharging windows 14*a*-14*c* no matter what size or shape of vials are stocked in the body of the machine as long as the sizes of the vials are within the range of what the gripping arms 92*a* and 92*b* can grip.

In the medicament dispensing machine 10, the gripping rollers 92*e* and 92*f* are provided at the tip of the gripping arms 92*a* and 92*b* so that they can freely rotate upon contacting to the body of the vial B. Thus, a problem that the label pasted by the label pasting means 70 is damaged is well prevented while the vial B is being removed from the gripping arms 92*a* and 92*b*. In the above embodiment, the gripping rollers 92*e* and 92*f* are provided on both the gripping arms 92*a* and 92*b*. However, the present invention is not limited to this, and the roller may be provided only on one of the arms. In this embodiment, as an example of rotating members, the gripping rollers 92*e* and 92*f* that can rotate contacting to the body of the vial B are provided. However, the rotating members are not limited to the rollers and can be comprised of balls.

In the medicament dispensing machine 10, the vial discharging windows 14*a*-14*c* open in coordination with the movement of the body of gripping means 94 to the vial discharging windows 14*a*-14*c*. Therefore, the vial can be smoothly dispensed out of the vial discharging windows 14*a*-14*c*. Further, in the medicament dispensing machine 10, after the vial B is removed from the gripping arms 92*a* and 92*b* projecting out of the vial discharging windows 14*a*-14*c*, the vial gripping means 92 retracts into the body 12. Coordinating with this, the vial discharging windows 14*a*-14*c* close. Therefore, in the medicament dispensing machine 10, after the vial B is taken out from the gripping arms 92*a* and 92*b*, it is possible to smoothly perform a next series of dispensing operations of the vial B.

In the medicament dispensing machine 10, the switches 92*c* and 92*d* are provided on the surfaces (contact portions) of the gripping arms 92*a* and 92*b*, where the gripping arms 92*a* and 92*b* contact to the body of the vial B. If the switches 92*c* and 92*d* become ON and it is confirmed that the vial is gripped, transfer of the vial B to the gripping arms 92*a* and 92*b* is executed. If either of the switches 92*c* and 92*d* is only ON, transfer of the vial B is not carried out. Therefore, it is possible to prevent a delivery failure of the vial B due to a breakdown of the gripping arms 92*a* and 92*b*.

In this embodiment, the switches 92*c* and 92*d* are provided on both of the gripping arms 92*a* and 92*b*. However, it is possible to provide only one switch. In the case only either of the switches 92*e* and 92*f* is provided on either of the gripping arms 92*a* and 92*b*, it may not be possible to detect the gripping failure of the vial B with the detection method explained above. It is still desirable to configure to detect the gripping failure by employing other method, architecture or mechanism.

In this embodiment, the switches 92*c* and 92*d* are provided as the vial detection means to detect whether the vial B is gripped or not by the vial gripping means 92. However, the present invention is not limited to these, and instead of the switches 92*c* and 92*d*, photoelectric sensors may be used.

In this embodiment, the vial gripping means 92 is comprised of the gripping arms 92*a* and 92*b* having approximately left-right symmetrical shapes. However, the present invention is not limited to this, and the gripping arms 92*a* and 92*b* may have asymmetric shapes.

In this embodiment, to prevent the delivery failure of the vial B in the vial gripping means 92, the positioning means is composed of a combination of the contact portions 100 and 100 and the guide pieces 96*h* and 96*i*, or composed of a combination of the engaging groove 102 and the engaging piece 104. However, the present invention is not limited to these configurations, and a configuration without the positioning means is even possible. The positioning means of the vial gripping means 92 explained above is just one example of the present invention, and other configuration may be adopted to determine the position of the vial gripping means 92. Furthermore, in this embodiment, the position of the vial gripping means 92 is determined by the combination of the engaging groove 102 and the engaging piece 104 in the location where the vial B is transferred from the transporting unit 80 to the vial gripping means 92. However, it is also possible to provide a part similar to the engaging piece 104 near the vial discharging windows 14*a*-14*c*. Then, the position of the vial gripping means 92 is determined when the vial B is discharged (dispensed) from the vial discharging windows 14*a*-14*c*.

Figure 18:
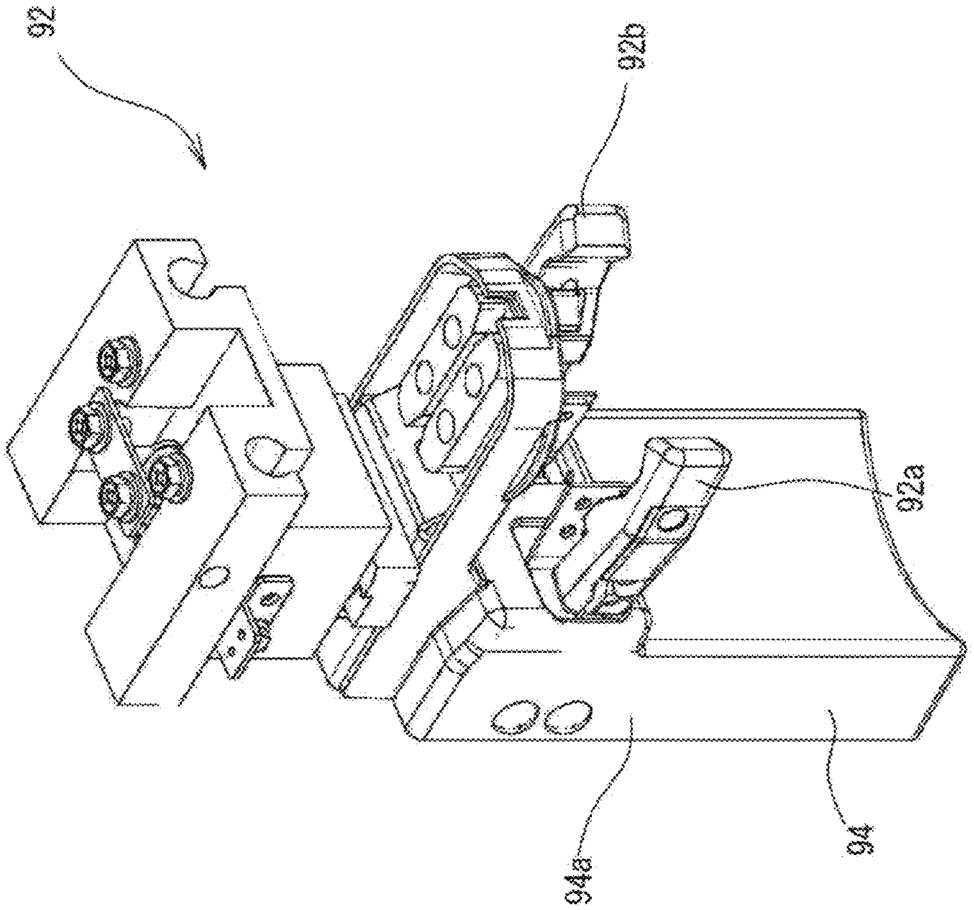
FIG. 18 is a perspective view of a body of gripping means of one modification example.

In this embodiment, the gripping rollers 92*e* and 92*f* are provided at the ends of the gripping arms 92*a* and 92*b* to prevent the damage of the label during the delivery of the vial B by vial gripping means 92. However, the present invention is not limited to this. In the case a label is not pasted on the vial B, the label printer 72 is not provided, or the label damage does not matter, as shown in FIG. 18, the gripping rollers 92*e* and 92*f* can be omitted.

<<Modification Example of Discharging Unit 150>>

Figure 19:
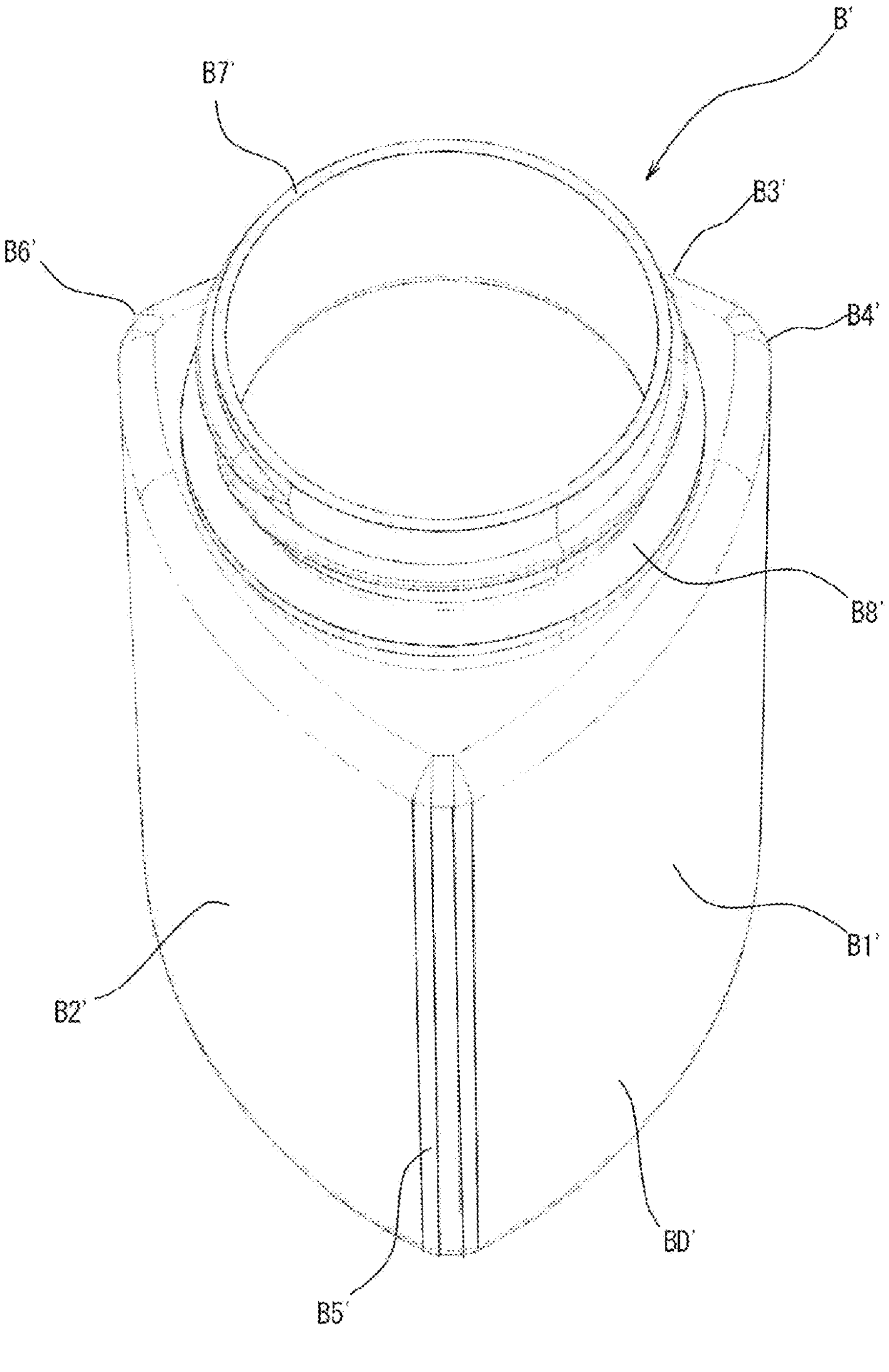
FIG. 19 is a perspective view of a vial whose body has an approximately triangular cross-sectional shape.

The discharging unit 90 described above is optimally used for the vial B whose body has a cylindrical shape. However, in the case the body of the vial has a polygonal cross-sectional shape such as vial B' shown in FIG. 19, whose body has a triangular shape, the gripping arms 92*a* and 92*b* of the discharging unit 90 are difficult to fit to the body of the vial B'. And, sufficient stability may not be obtained while the gripping arms 92*a* and 92*b* are gripping the vial B'. Therefore, to deal with the vial B' whose body has a polygonal cross-sectional shape, it is preferable to use gripping arms having shapes that can easily fit to the body of the vial B'.

In addition, even in either case of using the vial B whose body is cylindrical or using the vial B' whose body is polyhedral, to stably transport the vials B and B' to the vial discharging windows 14*a*-14*c*, it is preferable to configure a structure to grip a neck (neck B7') portion (opening end, upper end) of the vials B and B'. To solve such problems, it is possible to use a discharging unit 150 shown in FIG. 20 instead of the discharging unit 90. Below, the structure of the discharging unit 150 is described, referring figures. Since the discharging unit 150 has many structures, functions, and effects common to those of the discharging unit 90, the same numbers are used for the parts having the structures same as those of the discharging unit 90, and their explanations are omitted.

The discharging unit 150 supplies and discharges the vial B' from the transporting unit 80 to the vial discharging window 14. The discharging unit 150 is located in the same position as that of the discharging unit 90. The discharging unit 150 has a similar structure as that of the discharging unit 90 described above and contains a body of gripping means 94, a moving means 96 and an orientation changing mechanism 98. Since the structures, functions and effects of the body of gripping means 94, the moving means 96 and the orientation changing mechanism 98 are same as described above, their detailed explanations are omitted.

In contrast, the discharging unit 150 differs from the discharging unit 90 in that the discharging unit 150 contains a vial gripping means 152 and a vial holder 154 instead of the vial gripping means 92. The vial gripping means 152 receives and grips the vial B', which is filled with medicament in the tablet supply unit 30, from the transporting unit 80. These functions are same as those of the gripping means 92. However, the vial gripping means 152 has different structures from those of the gripping means 92 in that the vial gripping means 152 contains gripping arms 156 and 158 instead of the pair of gripping arms 92*a* and 92*b*.

Figure 20:
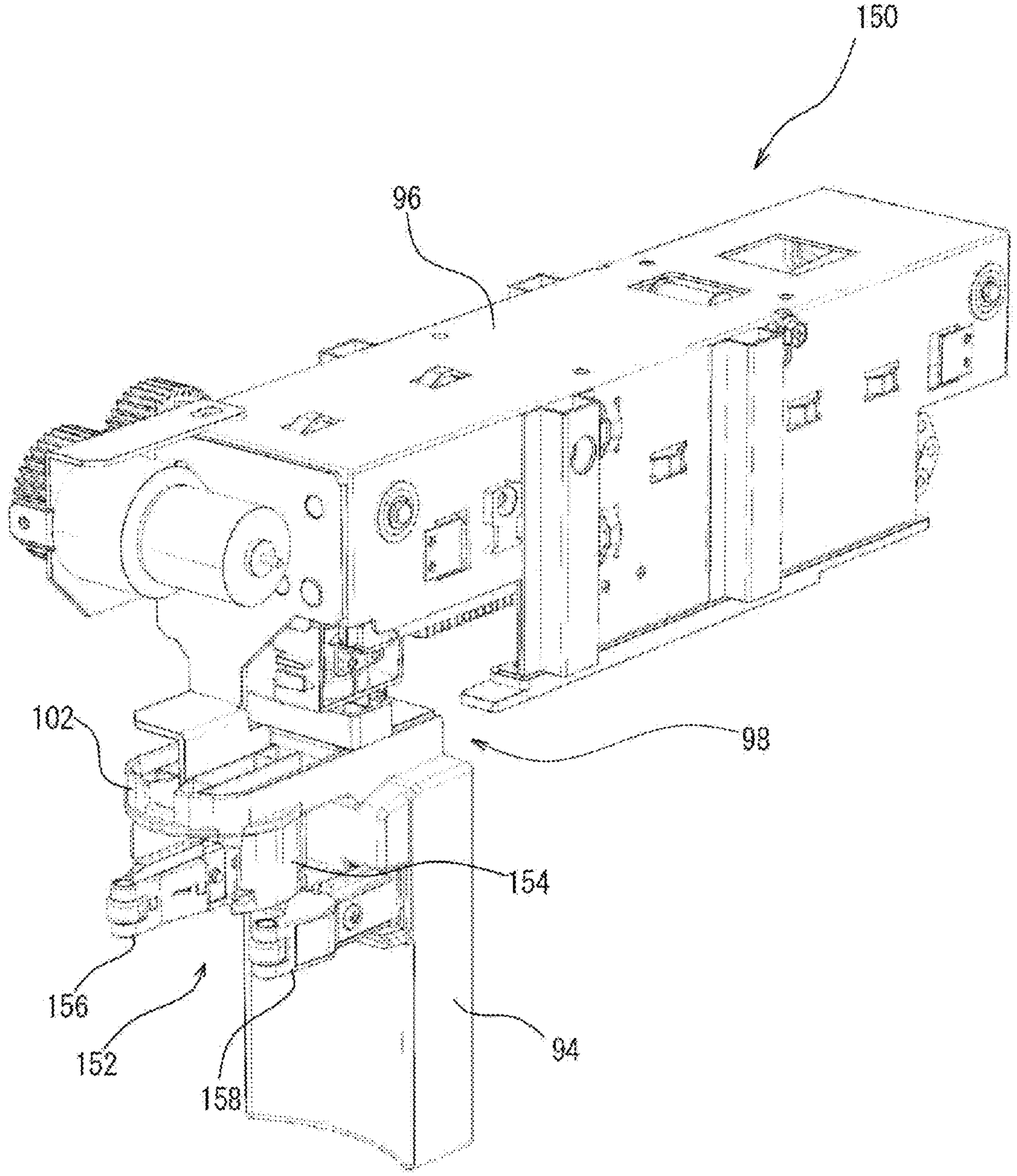
FIG. 20 is a perspective view of a discharging unit of the modification example.
Figure 21:
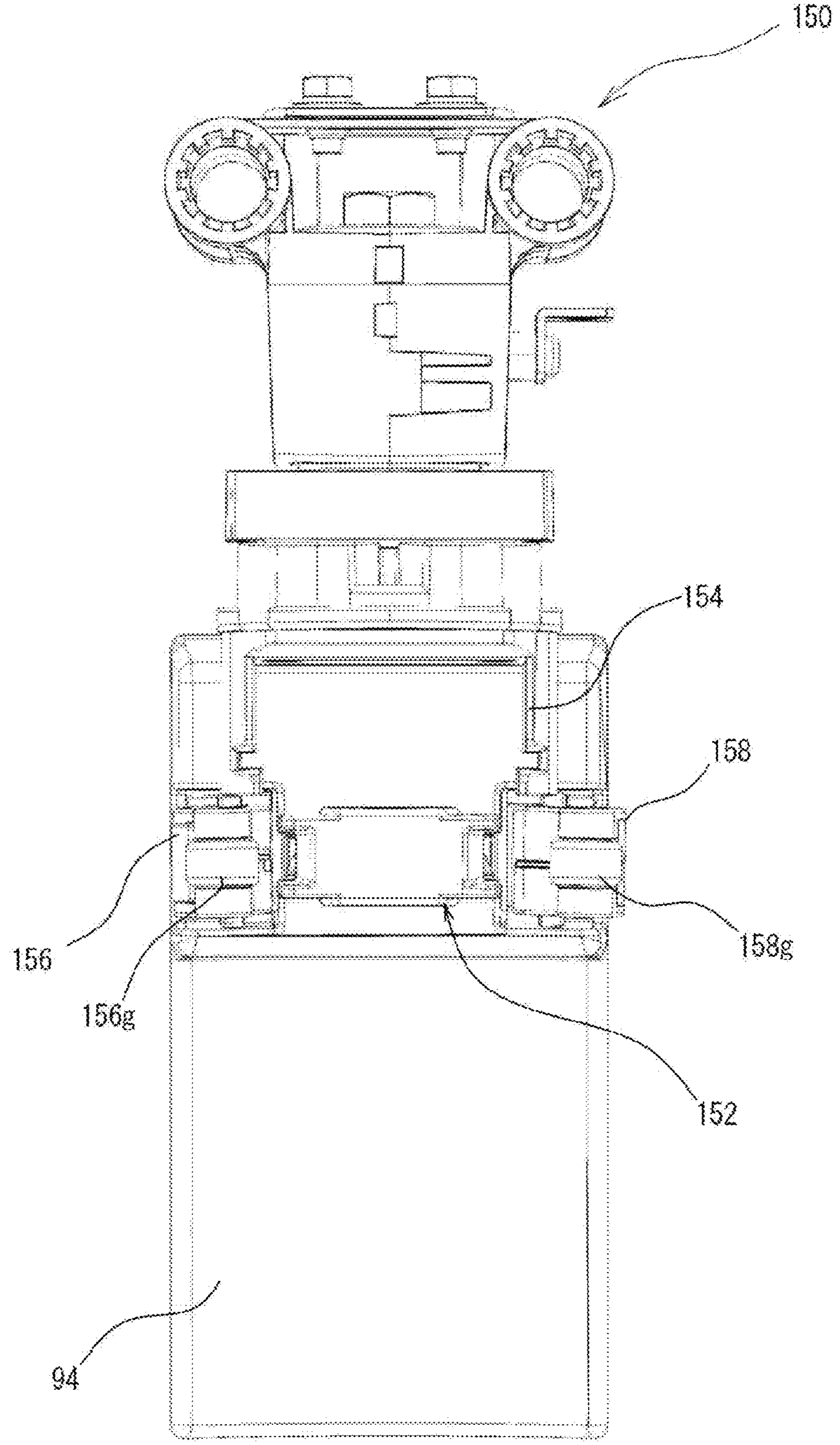
FIG. 21 is a front view of the discharging unit shown in FIG. 20.
Figure 22:
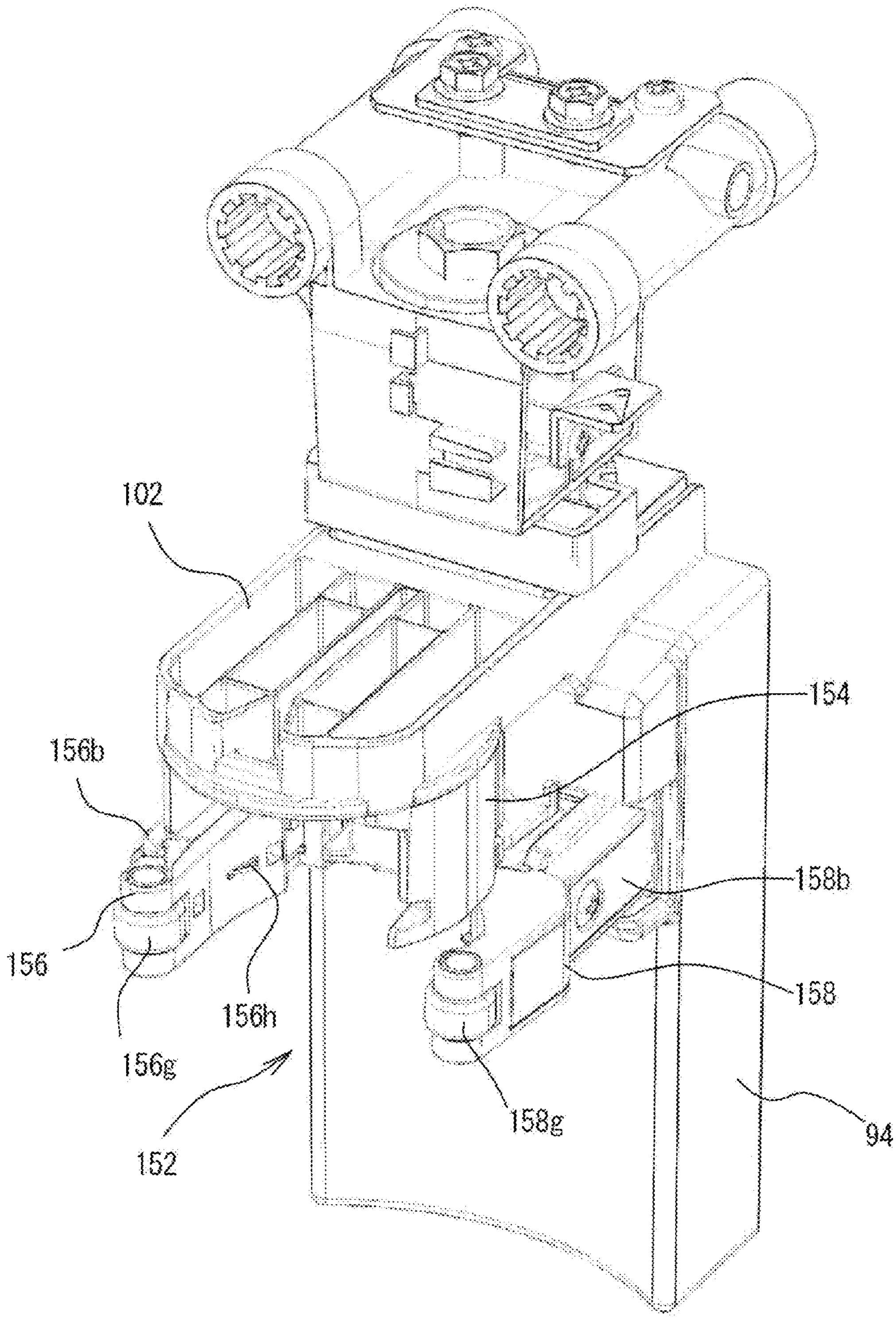
FIG. 22 is a perspective view of main parts of the discharging unit shown in FIG. 20.
Figure 23:
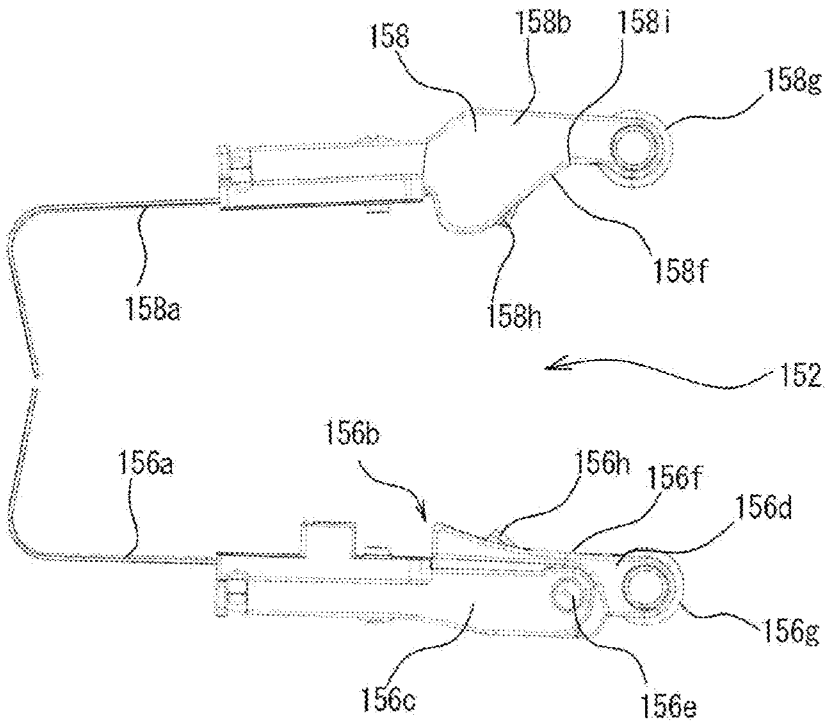
FIG. 23 (*a*) is a plan view showing a vial gripping means provided in the discharging unit shown in FIG. 20, and (*b*) is a plan view showing a state in which the vial gripping means shown in (*a*) grips the vial.
Figure 23:
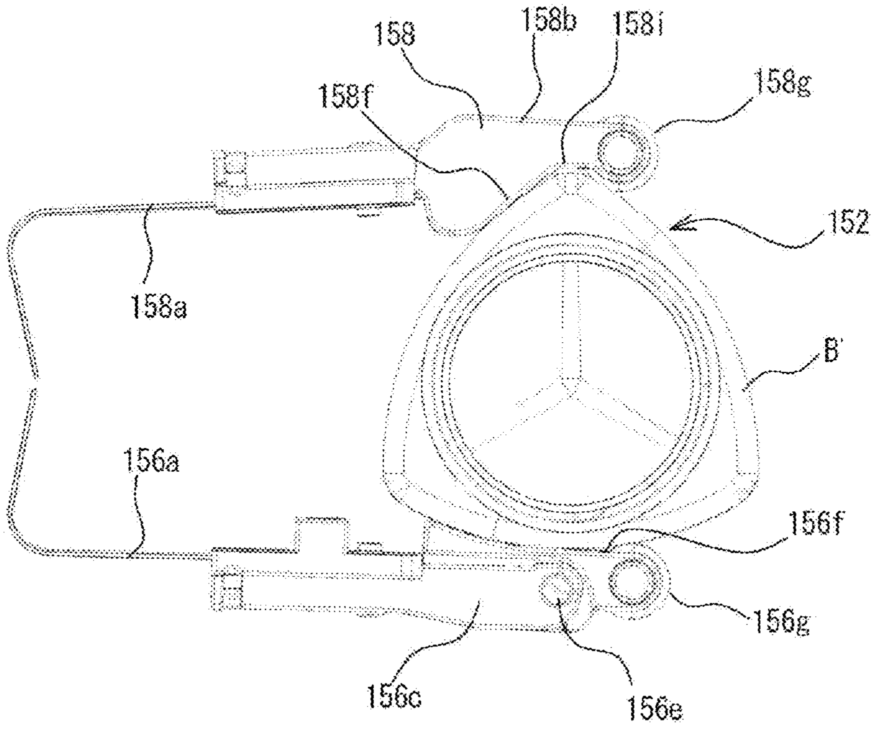
Figure 24:
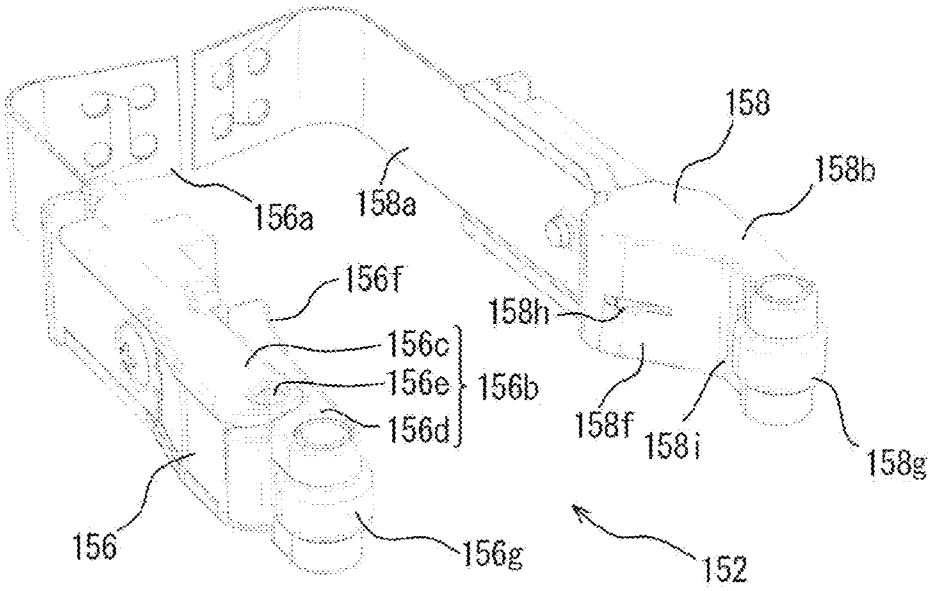
FIG. 24 (*a*) is a perspective view showing the vial gripping means provided in the discharging unit shown in FIG. 20, and (*b*) is a perspective view showing a state in which the vial gripping means shown in (*a*) grips the vial.
Figure 24:
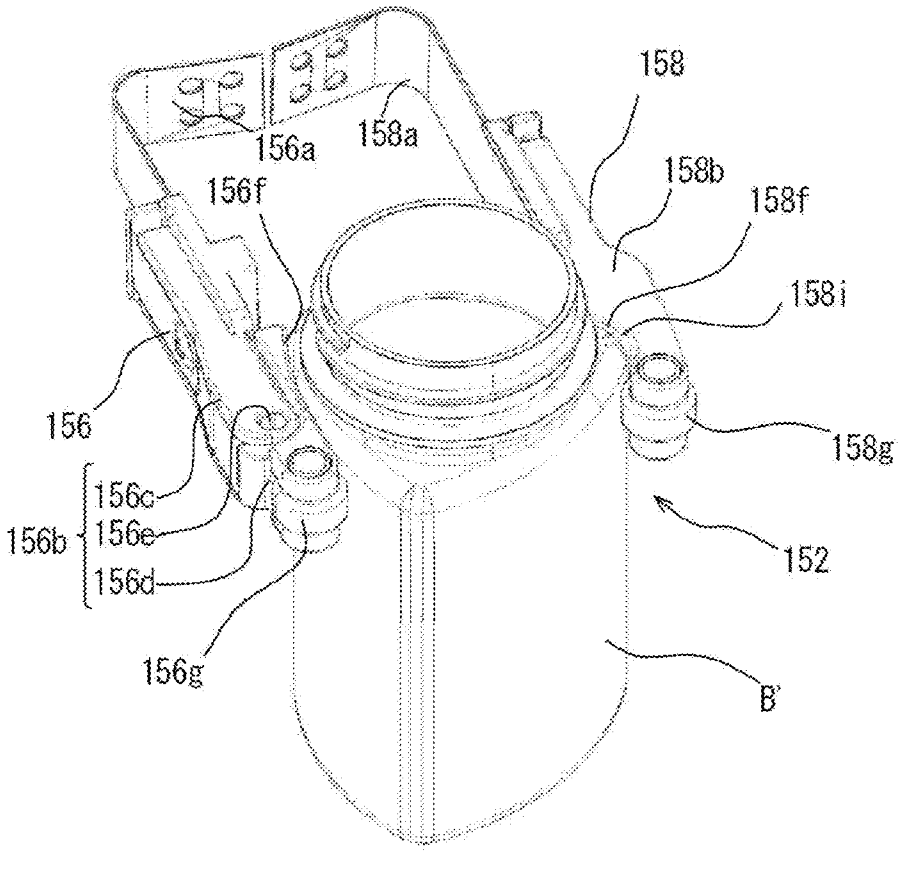
Figure 25:
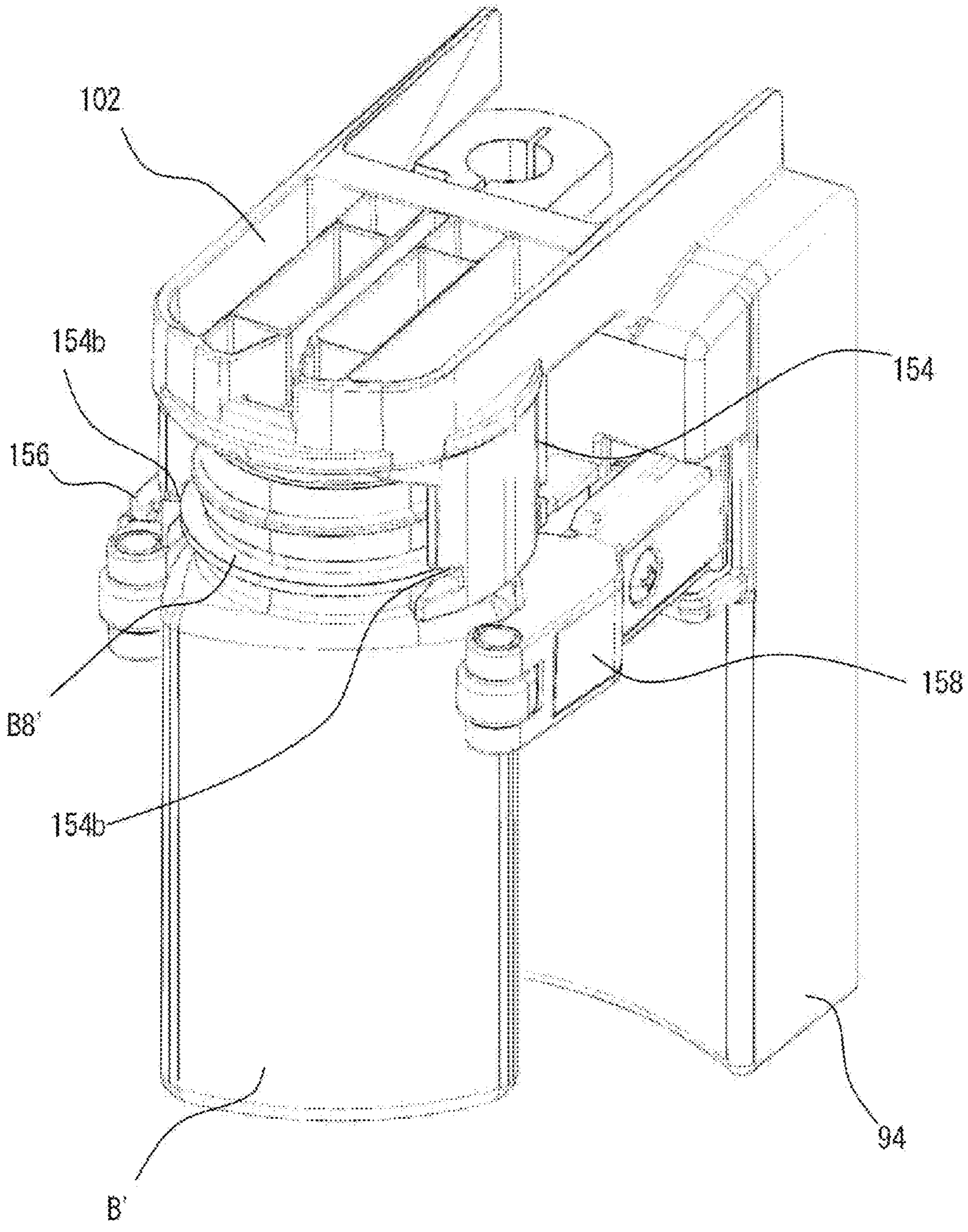
FIG. 25 is a magnified perspective view showing a state in which main parts of the discharging unit shown in FIG. 20 grip the vial.

As shown in FIGS. 20-22, the gripping arms 156 and 158 are arm-shaped members installed at left and right positions of the body of gripping means 94. As shown in FIGS. 23 & 24, the gripping arms 156 and 158 have a configuration in which a pair of grips 156*b* and 158*b* is provided at the tips of metal supports 156*a* and 158*a*. Grips 156*b* and 158*b* are parts for pinching and gripping the body BD' of the vial B' that has a trihedral shape.

Grip 156*b* has a configuration in which a body of grip 156*c* and a gripping piece 156*d* is connected by a pin 156*e*. The body of grip 156*c* is attached to the end of the support 156*a*. The body of grip 156*c* supports the gripping piece 156*d* so that the gripping piece 156*d* can swing around the pin 156*e*. A contact surface 156*f* is provided on the gripping piece 156*d* to facilitate the contact with the body BD' of the vial B'. As shown in FIGS. 23 (*b*) & 24 (*b*), the contact surface 156*f* has a shape such that the contact surface 156*f* fits to the sides B1'-B3' of the body BD' of the vial B'. The vial B' of this modification example has shapes of the sides B1'-B3' that are not flat but are curved like an arc. Therefore, the contact surface 156*f* has a curved shape with a curvature radius approximately similar to that of sides B1'-B3'.

At the tip of the gripping piece 156*d*, a gripping roller 156*g* (rotating member) is provided such that it can rotate freely. Like the gripping rollers 92*e* and 92*f*, the gripping roller 156*g* is provided to facilitate a smooth insertion and removal of the vial B' between the gripping arms 156 and 158, and to prevent a damage of the label pasted on the vial B'.

The gripping body 158*b* pairing with the gripping body 156*b* explained above contains a contact surface 158*f* capable of contacting with the body BD' of the vial B'. In the contact surface 158*f* is provided a bent portion 158*i* in which the contact surface 158*f* is bent to fit to the shapes of corners B4'-B6' formed around the junctions between the sides B1'-B3' on the body BD' of the vial B'.

Switches 156*h* and 158*h* are provided on the contact surface 156*f* of the gripping piece 156*d* and the contact surface 158*f* of the gripping body 158*b*. The switches 156*h* and 158*h* correspond to the switches 92*c* and 92*d* described above, and are used for detecting whether the vial B' is gripped by the gripping arms 152*a* and 152*b*. Switches 156*h* and 158*h* are electrically connected to a controller (not shown in the figure) of the medicament dispensing machine 10.

When both the switches 156*h* and 158*h* are ON, the gripping arms 156 and 158 are in a state in which the vial B' is firmly gripped. In the case the gripping arms 152*a* or 152*b* are broken, gripping the vial B' is not firm, or the shapes of the gripping sections of the gripping arms 152*a* or 152*b* do not fit to the outer circumference of the vial B' because of the polygonal shape of the vial, either of the switches 156*h* and 158*h* does not become ON, and the presence of the vial B' is not detected. In such a situation, transfer of the vial B' to the gripping arms 92*a* and 92*b* is not uncertain. Thus, the vial B' may not be securely gripped. It may be expected that the vial B' may fall inside the machine and result in a spill of the medicament. If it is determined that the transfer of the vial B' from the transporting unit 80 to the discharging unit 150 is complete based on the condition of both the switches 156*h* and 156*h* being ON, failures explained above can be prevented.

Figure 26:
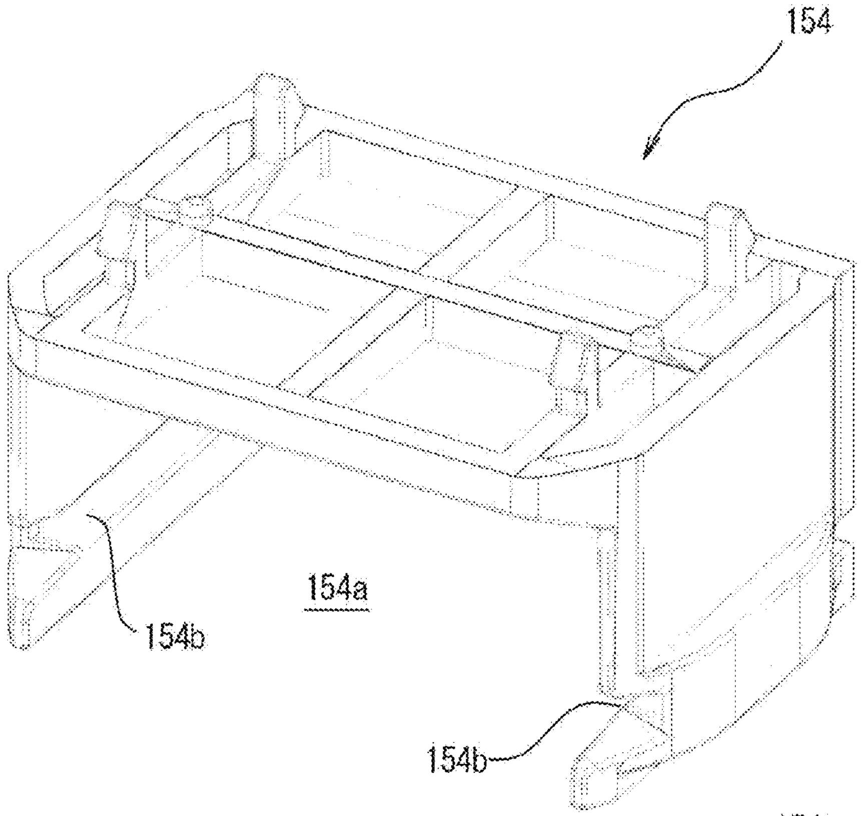
FIG. 26 (*a*) is a perspective view showing a vial holder, and (*b*) is a front view showing the vial holder.
Figure 26:
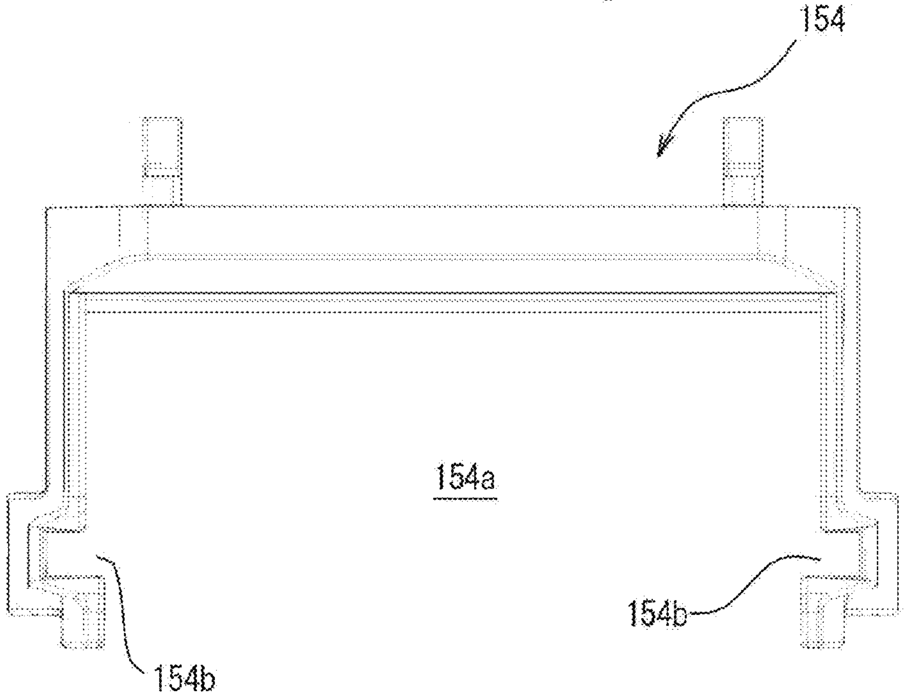
Figure 27:
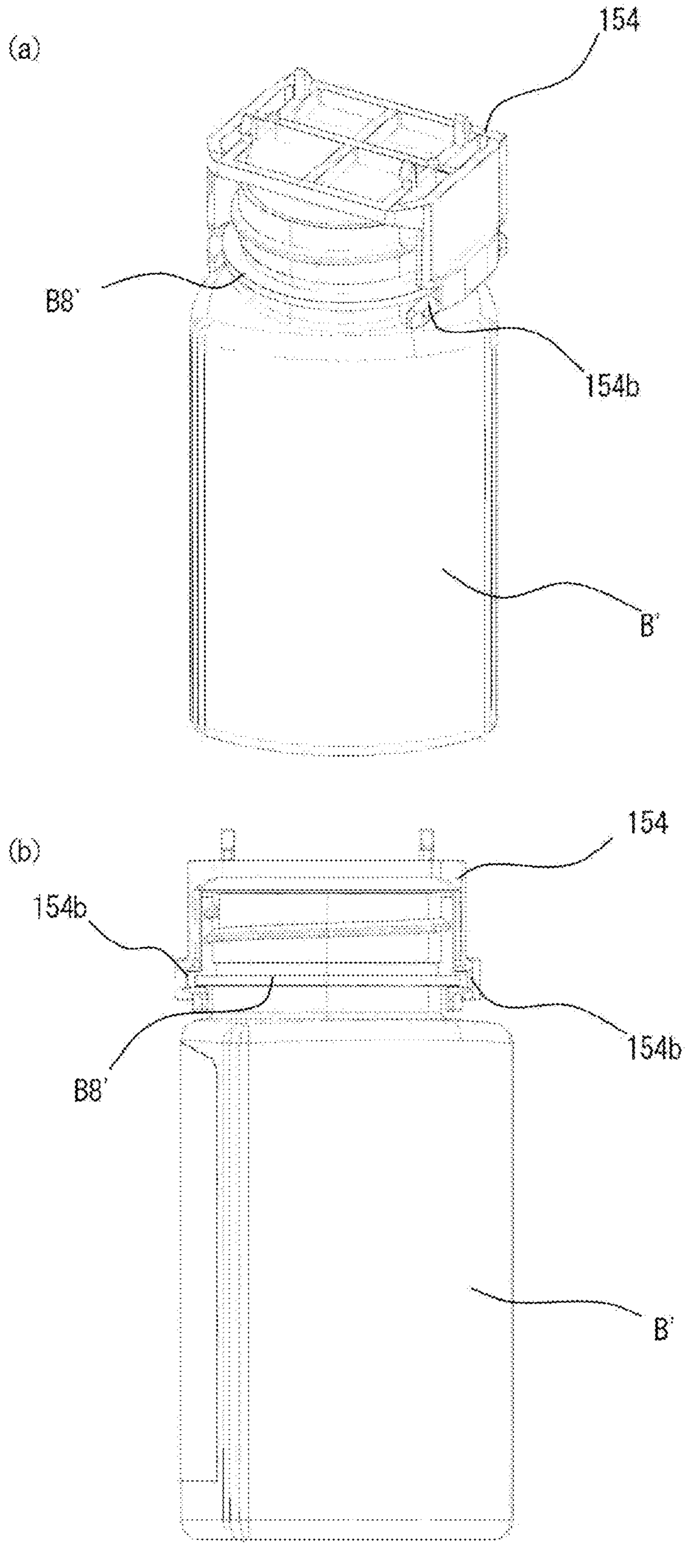
FIG. 27 (*a*) is a perspective view showing a state in which the vial holder holds the vial, and (*b*) is a front view of (*a*).

The vial holder 154 holds the neck B7' of the vial B'. As shown in FIGS. 20-22 & 25, the vial holder 154 is provided on a lower side of the eaves 102 that constitutes the body of gripping means 94. As shown in FIG. 26, the vial holder 154 has a space 154*a* where the neck B7' of the vial B' is accommodated. Grooves 154*b* are provided on both sides of the space 154*a*. As shown in FIG. 27, a flange B8' formed on the neck B7' of vial B' is inserted in the grooves 154*b*. Therefore, by inserting the neck B7' and the flange B8' in the space 154*a* and the grooves 154*b* with the vial B' upright, the vial B' is held at the neck portion B7'. This further improves the stability of the vial B' gripped by the vial gripping means 152.

<<Modifications Example of Transporting Unit 80>>

As shown in FIG. 4, the transporting unit 80 described above contains the gripping section that grips the vials B, B' by pinching the body BD' of the vials B and B' received from vial lifter 20. Specifically, as shown in FIG. 4, the gripping section of the transporting unit 80 contains transporting arms 82 and 84 for pinching the body BD' of the vials B, B'.

Figure 28:
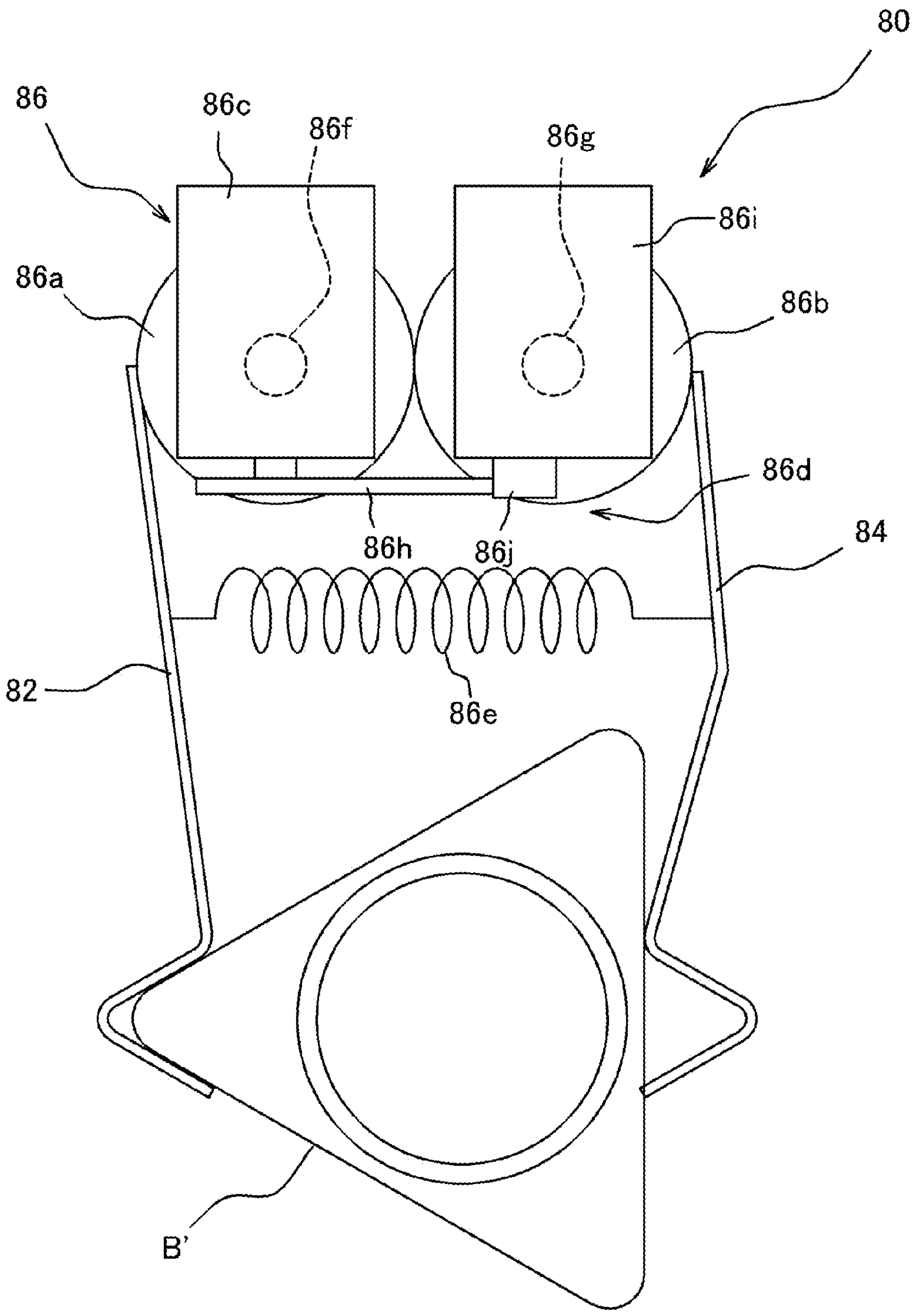
FIG. 28 is a schematic plan view showing a transporting unit of a modification example.
Figure 29:
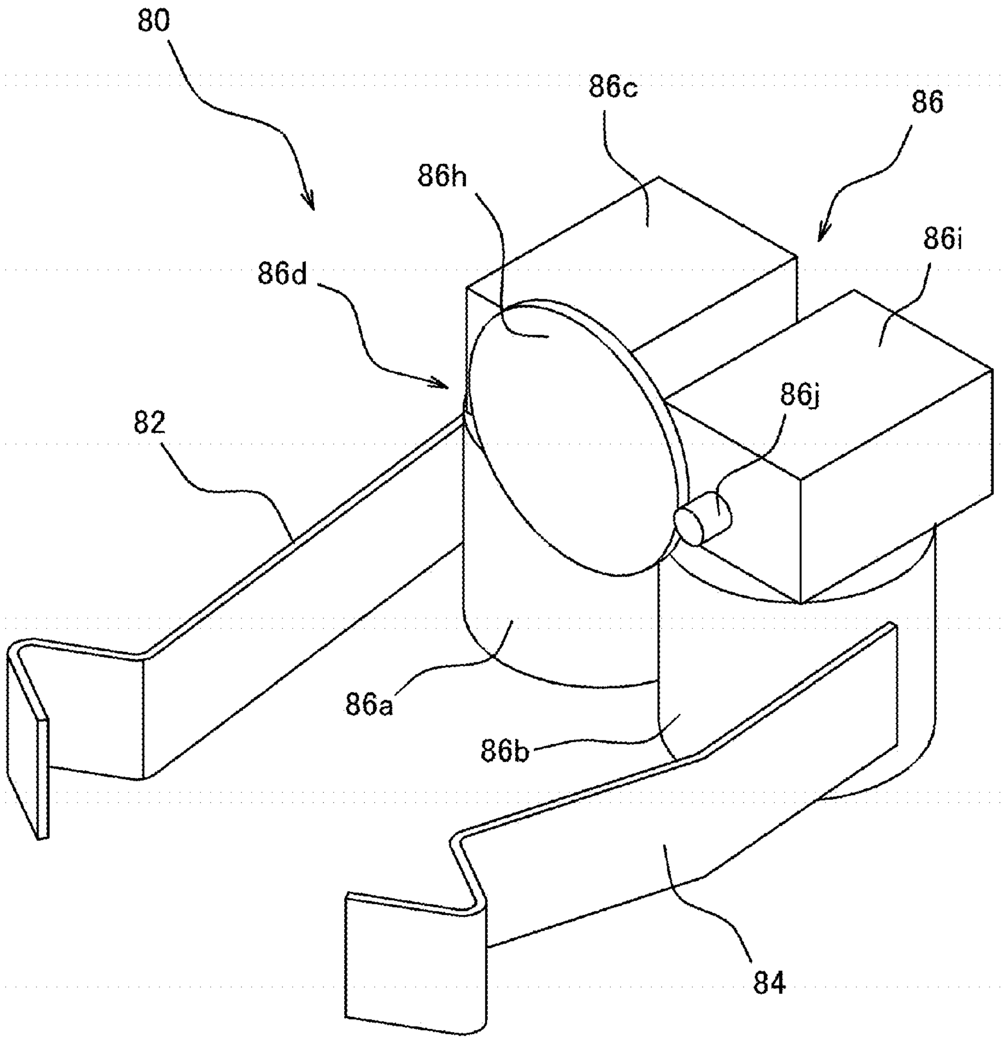
FIG. 29 is a perspective view of the transporting unit shown in FIG. 28 with its spring omitted.

In the case, the body BD' has a polygonal cross-sectional shape (triangular shape in the example shown in FIG. 19) like the vial B' described above, like the gripping arms 156 and 158 of the discharging unit 150 described above, it is preferable that the transporting arms 82 and 84 of the discharging unit 80 are configured to have shapes that fit to the shape of the body BD' of the vial B'. Specifically, as shown in FIGS. 28 & 29, it is preferable to configure the transporting arms 82 and 84 of the discharging unit 80 to have bent shapes that fit to the shapes of the corners B4'-B6' of the vial B'. By configuring the transporting arms 82 and 84 to have such shapes, it is possible to stably transfer the vial B' received from the vial lifter 20 to the discharging unit 90 or the discharging unit 150.

The transporting unit 80 contains an actuator 86 for driving the transporting arms 82 and 84. The actuator 86 contains cylindrical rotors 86*a* and 86*b*, motor 86*c* that functions as a drive source, a cam mechanism 86*d*, and a spring 86*e*. The cylindrical rotors 86*a* and 86*b* are installed so as to rotate around rotating shafts 86*f* and 86*g* in the body of the transporting unit 80. The basal ends of the transporting arms 82 and 84 are fixed on the outer circumference of the rotors 86*a* and 86*b*. Therefore, by rotating the rotors 86*a* and 86*b*, the transporting arms 82 and 84 can be opened and closed.

The motor 86*c* is installed on the rotor 86*a* as a single body. A cam 86*h* that constitutes the cam mechanism 86*d* is attached to the output shaft of the motor 86*c*. The cam 86*h* rotates eccentrically by running the motor 86*c*. A contact member 86*i* that constitutes the cam mechanism 86*d* is installed on the rotor 86*b* as a single body. The contact member 86*i* has a cylindrical projection 86*j*, and the outer periphery of the cam 86*h* contacts with the outer periphery of this projection 86*j*. Therefore, by driving the motor 86*c*, the transporting arms 82 and 84 are opened and closed by rotating the rotors 86*a* and 86*b* by the action of the cam mechanism 86*d*. Further, the spring 86*e* is provided in the basal end portion of the transporting arms 82 and 84 (omitted in FIG. 29). The transporting arms 82 and 84 are always biased in the closing direction by the spring 86*e*.

The transporting unit 80 receives the vial B or B' and releases the gripping vials B and B' by driving the actuator 86 and widening the gap between the transporting arms 82 and 84. After receiving the vial B or B', the transporting arms 82 and 84 are forced to press the body of the vial B or B' due to the bias force of the spring 86*e*. Thereby, the vial B or B' is gripped by the transporting arms 82 and 84.

In this modification example, the spring 86*e* is used for generating the gripping force of the transporting arms 82 and 84, and the motor 86*c* is used as a power source to open the transporting arms 82 and 84. However, the present invention is not limited to this. For example, the device may be configured such that a motor or other driving source may generate a force to close the transporting arms 82 and 84, or a driving source may generate a gripping power for the transporting arms 82 and 84. In other words, a motor or other driving source may be configured to make the transporting arms 82 and 84 not only open but also close.

In such a configuration, by applying overcurrent to the motor or other driving source to close the transporting arms 82 and 84, it is possible even to grip the vials B or B' having different sizes. If the driving source is operated so that the transporting arms 82 and 84 close even after the transporting arms 82 and 84 are in contact with the body of the vial B or B' to grip the vial B or B', it is possible to strongly grip the vial B or B', no matter what size and shape the vial B or B' has. If the power consumption of the drive source due to the overcurrent is excessive, or if the vial B or B' cannot be gripped firmly enough even by applying the overcurrent to the drive source, it is preferable to utilize the bias force of the spring 86*e* to generate the gripping force of the vial B or B' as explained in the modification example above (see FIG. 28). Thereby, the motor or the other driving source is prevented from worn-out caused by the overcurrent, and the longevity of the driving source can be prolonged.

<<Action of Transferring the Vial B or B' to the Discharging Unit 90 or 150>>

Next, the action of the modification example of transferring the vial B or B' to the discharging unit 90 or 150 from the transporting unit 80 is described. The transfer of the vial B or B' from the transporting unit 80 to the discharging unit 90 or 150 is completed if the switches 92*c* and 92*d* or the switches 156*h* and 158*h* provided in the discharging unit 90 or 150 become ON, and the transporting unit 80 releases the vial B or B'.

If the switches 92*c* and 92*d* or the switches 156*h* and 158*h* do not become ON because of insufficient accuracy of positioning of the transporting unit 80 to the discharging unit 90 or 150, transferring operation of the vial B or B' cannot be completed. When the transferring operation cannot be properly completed, there is a possibility that an error notification is reported by a notifying means (not shown in the drawing) provided separately.

To eliminate such possibility, upon transferring the vial B or B' from the transporting unit 80 to the discharging unit 90 or 150, it is preferable to run an operation (transfer check operation) of further moving the transporting unit 80 towards the discharging unit 90 or 150 if the switches 92*c* and 92*d* or the switches 156*h* and 158*h* do not become ON. In other words, it is preferable to perform an operation (transfer check operation) to adjust the degree of pressing the switches 92*c* and 92*d* or the switches 156*h* and 158*h* by adjusting the distance of the transporting unit 80 to the discharging unit 90 or 150. In addition to performing this transfer check operation, by checking whether the switches 92*c* and 92*d* or the switches 156*h* and 158*h* become ON or not, it is possible to avoid a maldetection due to the contact failure between the vial B or B' and the switches 92*c* and 92*d* or the switches 156*h* and 158*h*. It is possible to adjust the movement amount of the transporting unit 80 based on the situation of the transfer check operation. In the transfer check operation, the transporting unit 80 can be moved not only in the approaching direction to the discharging unit 90 or 150 but also in a direction away from it.

In the case the switches 92*c* and 92*d* or the switches 156*h* and 158*h* do not become ON even after executing the transfer check operation, it is preferable to execute the transfer operation of the vial B or B' after returning the transporting unit 80 to a default position (retry operation). By performing the retry operation, it is possible to avoid problems of errors due to the contact failure between the vial B or B' and the switches 92*c* and 92*d* or the switches 156*h* and 158*h*.

Furthermore, despite the execution of the transfer check operation described above, when the completion of the vial B or B' is not confirmed, there is a possibility that the contact failure between the vial B or B' and the switches 92*c* and 92*d* or the switches 156*h* and 158*h* is caused not because of the distance from the transporting unit 80 to the discharging units 90 and 150, but because of the inadequate accuracy in a vertical or left-right positioning. Therefore, even when the transfer of the vial B or B' cannot be completed in spite of the transfer check operation, the vertical and left-right position may be adjusted by returning the transporting unit 80 to a default position, and then whether the switches 92*c* and 92*d* or the switches 156*h* and 158*h* become ON may be checked.

EXPLANATION OF NUMBERS

10 Medicament dispensing machine
12 Body of the medicament dispensing machine
14*a*-14*c* Vial discharging window
30 Tablet supply unit (medicament filling means)
72 Label printer (Label pasting means)
80 Transporting unit
82, 84 Transporting arms
90 Discharging unit
92 Vial gripping means
92*a*, 92*b* Gripping arms
92*c*, 92*d* Switches
92*e*, 92*f* Gripping rollers (rotating members)
94 Body of gripping means
96 Moving means
96*h*, 96*i* Guide piece
98 Orientation changing mechanism
100 Contact piece
102*a* Engaging groove (first engaging means)
104 Engaging piece (second engaging means)
110 Door
150 Discharging unit
152 Vial gripping means
154 Vial holder
156, 158 Gripping arms
156*d* Gripping pieces
158*i* Bent portion

What is claimed is:

1. A medicament dispensing machine, comprising:
a medicament filling device having a first vial gripping device for filling an empty vial with a medicament;
a discharging unit having a second vial gripping device for receiving a vial filled with the medicament from the first vial gripping device;
a vial discharging window for discharging the vial filled with the medicament by the second vial gripping device; and
an input device for receiving information about the vial filled with the medicament;
wherein the second vial gripping device is configured to wait, in an area not directly accessible from outside, for receipt of an input signal from the input device before discharging the vial filled with the medicament from the vial discharging window, wherein the input device is adapted to generate the input signal only after a request for discharge is made by an operator.

2. The medicament dispensing machine of claim 1, wherein the input signal comprises a permitting access.

3. The medicament dispensing machine of claim 2, wherein the permitting access is generated when a person requesting access has authority to pick up the vial filled with the medicament.

4. The medicament dispensing machine of claim 2, wherein the permitting access is generated when the person requesting access is the same as the person initiating the dispensing or the person requesting access has authority to pick up medicament for the person initiating the dispensing.

5. The medicament dispensing machine of claim 1, wherein the medicament filling device identifies whether the medicament filling device has performed filling of the empty vial with the medicament based on the input information inputted by the input device.

6. A medicament dispensing machine, comprising:
a medicament filling device having a first vial gripping device for filling an empty vial with a medicament;
a discharging unit having a second vial gripping device for moving the vial filled with the medicament for discharging;
a vial discharging window for discharging the vial filled with the medicament by the second vial gripping device;
a storage area located between the first and the second vial gripping devices for storing the vial filled with the medicament, said storage area comprising a delivery table and a plurality of holding members;
an input device for receiving information about the vial filled with the medicament; and
a controller for permitting access to the vial filled with the medicament based on the information inputted by the input device, said controller is configured to allow multitasking and is capable of issuing commands to dispense, unlock, clean, stock or maintenance of vials,
wherein the first vial gripping device is configured to move the vial filled with the medicament to the storage area and to leave the vial filled with the medicament on the delivery table, and the second vial gripping device is configured to pick up and move the vial filled with the medicament from said delivery table to one of the plurality of holding members, and
wherein, responsive to a command to unlock which is only issued after a request for access is made by an operator, the second vial gripping device is further configured to move the vial filled with the medicament toward the vial discharging window.

7. The medicament dispensing machine of claim 6, wherein the command to unlock comprises a permitting access.

8. The medicament dispensing machine of claim 7, wherein the permitting access is generated when the person requesting access is the same as the person initiating the dispensing or the person requesting access has authority to pick up medicament for the person initiating the dispensing.

9. The medicament dispensing machine of claim 6, wherein the medicament filling device identifies whether the medicament filling device has performed filling of the empty vial with the medicament based on the input information inputted by the input device.

10. The medicament dispensing machine of claim 7, wherein the permitting access is generated when a person requesting access has authority to pick up the vial filled with the medicament.

11. The medicament dispensing machine of claim 6, wherein each of the plurality of holding members comprises a camera for verifying contents of the vial filled with the medicament before discharge at the vial discharging window.

12. The medicament dispensing machine of claim 6, wherein in response to the command to unlock, the second vial gripping device is configured to transfer the vial filled with the medicament from said one or other of the plurality of holding members to the vial discharging window.

* * * * *